US009258111B2

(12) United States Patent
Lee et al.

(10) Patent No.: US 9,258,111 B2
(45) Date of Patent: Feb. 9, 2016

(54) MEMORY DEVICE WHICH PROTECTS SECURE DATA, METHOD OF OPERATING THE MEMORY DEVICE, AND METHOD OF GENERATING AUTHENTICATION INFORMATION

(71) Applicants: Jae-Bum Lee, Yongin-Si (KR);
Hyoung-Suk Jang, Suwon-si (KR);
Min-Kwon Kim, Hwaseong-si (KR);
Seok-Heon Lee, Suwon-si (KR)

(72) Inventors: Jae-Bum Lee, Yongin-Si (KR);
Hyoung-Suk Jang, Suwon-si (KR);
Min-Kwon Kim, Hwaseong-si (KR);
Seok-Heon Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 146 days.

(21) Appl. No.: 13/677,715

(22) Filed: Nov. 15, 2012

(65) Prior Publication Data

US 2013/0159733 A1    Jun. 20, 2013

Related U.S. Application Data

(60) Provisional application No. 61/585,333, filed on Jan. 11, 2012.

(30) Foreign Application Priority Data

Dec. 16, 2011 (KR) .......................... 10-2011-0136797

(51) Int. Cl.
*H04L 9/32* (2006.01)
*H04L 9/08* (2006.01)

(52) U.S. Cl.
CPC ................ *H04L 9/08* (2013.01); *H04L 9/0822* (2013.01); *H04L 9/0877* (2013.01); *H04L 9/0897* (2013.01); *H04L 2209/605* (2013.01)

(58) Field of Classification Search
CPC ....... H04L 9/08; H04L 9/0822; H04L 9/0877; H04L 9/0897
USPC .................................. 713/168, 193; 380/286
See application file for complete search history.

(56) References Cited

U.S. PATENT DOCUMENTS

| 7,092,308 | B2 | 8/2006 | Choi et al. |
| 7,509,588 | B2 | 3/2009 | Van Os et al. |
| 8,027,194 | B2 | 9/2011 | Lee et al. |
| 8,321,686 | B2 * | 11/2012 | Holtzman ............... G06F 21/72 380/277 |
| 8,423,788 | B2 * | 4/2013 | Holtzman ............... G06F 21/77 380/277 |

(Continued)

FOREIGN PATENT DOCUMENTS

| JP | 2000-339417 A | 12/2000 |
| KR | 10-0857760 B1 | 9/2008 |

(Continued)

OTHER PUBLICATIONS

Office Action dated Jan. 30, 2015 for co-pending U.S. Appl. No. 13/677,853.

*Primary Examiner* — Thu Ha Nguyen
(74) *Attorney, Agent, or Firm* — Harness, Dickey & Pierce, P.L.C.

(57) ABSTRACT

In one embodiment, the memory device includes a first memory area and a second memory area. The first memory area stores secure data. The first memory area is inaccessible by an external device. The second memory area is configured to store encrypted secure data. The second memory area is accessible by the external device, and the encrypted secure data is an encrypted version of the secure data in the first memory area.

22 Claims, 24 Drawing Sheets

MUK(112): MEMORY UNIQUE KEY
EMUK(122): ENCRYPTED MEMORY UNIQUE KEY

(56) References Cited

U.S. PATENT DOCUMENTS

| | | | |
|---|---|---|---|
| 2003/0135748 A1* | 7/2003 | Yamada | G06F 21/10 713/193 |
| 2003/0177379 A1* | 9/2003 | Hori | G06F 21/10 713/193 |
| 2003/0200176 A1* | 10/2003 | Foster | H04L 9/0822 705/51 |
| 2005/0195975 A1* | 9/2005 | Kawakita | H04L 9/0822 380/30 |
| 2006/0026340 A1* | 2/2006 | Ito | G11C 5/04 711/103 |
| 2007/0035381 A1* | 2/2007 | Davis | G06K 19/0723 340/10.1 |
| 2007/0098179 A1* | 5/2007 | Nave | G11B 20/00086 380/286 |
| 2007/0106836 A1 | 5/2007 | Lee et al. | |
| 2008/0065911 A1* | 3/2008 | Elazar | G06F 21/10 713/194 |
| 2008/0301003 A1* | 12/2008 | Harkabi | G06Q 30/0603 705/27.1 |
| 2008/0310628 A1* | 12/2008 | Fujioka | G06F 11/1469 380/201 |
| 2009/0177886 A1* | 7/2009 | Takano | G06F 21/10 713/168 |
| 2009/0232314 A1 | 9/2009 | Kato et al. | |
| 2009/0267743 A1* | 10/2009 | Faroe | H04Q 9/00 340/10.1 |
| 2010/0031349 A1* | 2/2010 | Bingham | G06F 21/31 726/20 |
| 2010/0062715 A1 | 3/2010 | Kim et al. | |
| 2010/0082890 A1 | 4/2010 | Heo et al. | |
| 2010/0199081 A1 | 8/2010 | Lee et al. | |
| 2010/0306583 A1 | 12/2010 | Kim et al. | |
| 2010/0309237 A1 | 12/2010 | Roh | |
| 2011/0131470 A1* | 6/2011 | Kambayashi | G06F 21/79 714/763 |
| 2012/0315017 A1* | 12/2012 | Matsushita | H04N 21/4147 386/252 |
| 2013/0145481 A1* | 6/2013 | Kozuka | H04L 9/08 726/27 |
| 2013/0275656 A1* | 10/2013 | Talagala | G06F 12/0246 711/103 |
| 2013/0336477 A1* | 12/2013 | Kato | H04L 9/0822 380/44 |
| 2013/0336488 A1* | 12/2013 | Kato | H04L 9/0822 380/282 |
| 2013/0336489 A1* | 12/2013 | Kato | H04L 9/0822 380/285 |
| 2014/0075207 A1* | 3/2014 | Kato | G11B 20/00086 713/193 |

FOREIGN PATENT DOCUMENTS

| | | |
|---|---|---|
| KR | 2010-0017907 A | 2/2010 |
| KR | 20100099871 A | 9/2010 |

* cited by examiner

MEMORY DEVICE WHICH PROTECTS SECURE DATA, METHOD OF OPERATING THE MEMORY DEVICE, AND METHOD OF GENERATING AUTHENTICATION INFORMATION

This application claims priority from Korean Patent Application No. 10-2011-0136797 filed on Dec. 16, 2011 in the Korean Intellectual Property Office, the disclosure of which is incorporated herein by reference in its entirety. This application also claims priority from U.S. provisional application 61/585,333 filed on Jan. 11, 2012, the disclosure of which is incorporated herein by reference in its entirety.

BACKGROUND

1. Field of the Invention

Example embodiments relate to a memory device which protects secure data and/or a method of protecting data using the secure data, and more particularly, to a memory device which stores secure data and protects the stored secure data and/or a method of authenticating the memory device using the secure data stored in the memory device.

2. Description of the Related Art

Recently, various types of memory storage devices have been introduced. Some examples include a memory card that uses a flash memory as a storage medium, a universal serial bus (USB) memory that can be connected to a USB port, and a solid state drive (SSD). As evidenced by these memory storage devices, memory storage devices are becoming larger in storage capacity and smaller in volume, and their interface is insertable into/removable from a host device. Thus, the mobility of memory storage devices is increasing. For example, as a new type of hard disk, which is evaluated as one of inexpensive memory storage devices, an external hard disk has been introduced. The external hard disk offers mobility unlike a conventional hard disk fixed to a personal computer.

This trend is not limited to memory storage devices. Host devices which can consume contents stored in a memory storage device are also becoming smaller and portable. Accordingly, an environment in which digital contents stored in a memory storage device can be enjoyed anytime and anywhere has been created. With the creation of this environment, contents are increasingly being distributed in the form of digital data. This increases the importance of a technology that prevents illegal copying of digital contents stored in a memory storage device.

One example of the technology that prevents illegal copying of digital contents is a technology that encrypts digital contents using a unique key stored in a memory storage device. However, if the unique key stored in the memory storage device is leaked, the digital contents can be decrypted in the environment in which digital contents are not controlled. As a result, illegal copying of the digital contents is possible. In this regard, a technology that can prevent the leakage of a unique key stored in the storage device is desirable.

SUMMARY

Some example embodiments relate to a memory device.

In one embodiment, the memory device includes a first memory area and a second memory area. The first memory area stores secure data. The first memory area is inaccessible by an external device. The second memory area is configured to store encrypted secure data. The second memory area is accessible by the external device, and the encrypted secure data is an encrypted version of the secure data in the first memory area.

The external device may be a host device, a memory controller, etc.

In one embodiment, the memory device further includes input/output logic configured to interface the memory device with the external device.

In one embodiment, the secure logic is configured to access the secure data from the first memory area, generate the encrypted secure data from the accessed secure data, and store the encrypted secure data in the second memory area.

In one embodiment, the second area is configured to store the encrypted secure data received from a manufacturer of the memory device.

In one embodiment, the second area is configured to store the encrypted secure data during the manufacture of the memory device.

In one embodiment, the secure data includes a main key for authenticating the memory device, and the encrypted secure data includes an encrypted main key. In this embodiment, the first area may be configured to store at least one spare key, the spare key for generating authentication information of the memory device. In this embodiment, the second area may be configured to store at least one spare key index, the spare key index being linked to the spare key. The spare key index may correspond to a vendor of the memory device. In this embodiment, the memory device may further include a third memory area configured to store at least one encrypted decryption key. The third memory area is accessible by the external device. The encrypted decryption key is an encrypted version of a decryption key, and the decryption key is for decrypting the encrypted main key. In this embodiment, the third memory area may be configured to store a plurality of encrypted decryption keys. At least one of the plurality of encrypted decryption keys may correspond to a vendor of the external device.

In one embodiment, the secure data includes a main key for authenticating the memory device, and the encrypted secure data includes an encrypted main key. In this embodiment, the first memory area may be configured to store a plurality of spare keys. The plurality of spare keys are for generating authentication information of the memory device. The second memory area is configured to store a plurality of spare key indexes. The plurality of spare key indexes are linked to the plurality of spare keys. The plurality of spare key indexes may correspond to a vendor of the memory device.

In one embodiment, a third memory area is configured to store at least one encrypted decryption key. The third memory area is accessible by the external device. The encrypted decryption key is an encrypted version of a decryption key, and the decryption key is for decrypting the encrypted main key. The third memory area may be configured to store a plurality of encrypted decryption keys. At least one of the plurality of encrypted decryption keys may correspond to a vendor of the external device.

In another embodiment of the memory device, the memory device includes a first memory area storing a main key and at least one spare key. The first memory area is inaccessible by external devices. The memory device also includes a second memory area configured to store an encrypted main key and at least one spare key index. The second memory area is accessible by the external devices. The encrypted secure data is an encrypted version of the secure data in the first memory area. The spare key index is linked to the spare key, and the spare key index is associated with a vendor of the memory device.

In one embodiment, the spare key index is linked to the spare key by a spare key number.

In one embodiment, the first memory area stores a plurality of spare keys, and the second memory area is configured to store a plurality of spare key indexes. The plurality of spare key indexes are linked to the plurality of spare keys.

In one embodiment, the plurality of spare key indexes are linked to the plurality of spare keys by spare key numbers.

In one embodiment, the memory device further includes a third memory area storing a plurality of encrypted decryption keys. The third memory area is accessible by the external device. The encrypted decryption keys are encrypted versions of a respective plurality of decryption keys. The plurality of decryption keys are for decrypting the encrypted main key, and the plurality of decryption keys are associated with vendors of the external devices.

A further embodiment of the memory device includes a first memory area storing secure data, and a second memory area configured to store encrypted secure data. The encrypted secure data is an encrypted version of the secure data in the first memory area. The memory device is configured such that output of the secure data cannot occur, and output of the encrypted secure data can occur.

In a still further embodiment of the memory device, the memory device includes a first memory area storing a main key and a spare key. The first memory area is inaccessible to an external device. The memory device further includes a first encrypter configured to generate a session key based on the spare key and input received from the external device, and a second encrypter configured to generate authentication information based on the session key and a main key. The second encrypter is configured to output the authentication information to the external device.

In one embodiment, the memory device further includes a third encrypter configured to encrypt the spare key based on a spare key variant number received from the external device to produce a spare key variant. Here, the first encrypter is configured to encrypt the spare key variant based on a random number received from the external device to generate the session key.

In one embodiment, the second encrypter is configured to encrypt the main key using the session key to generate the authentication information.

In one embodiment, the memory device further includes a selector configured to obtain the spare key based on a target spare key number received from the external device.

In another embodiment, the memory device further includes a selector configured to receive a target spare key number from the external device and select one of a plurality of spare keys stored in the first memory area based on the target spare key number, and a third encrypter configured to encrypt the selected spare key based on a spare key variant number received from the external device to produce a spare key variant. Here, the first encrypter is configured to encrypt the spare key variant based on a random number received from the external device to generate the session key.

In one embodiment, the second encrypter is configured to encrypt the main key using the session key to generate the authentication information.

Some embodiment relate to a method of operating a memory device.

One embodiment of the method includes storing secure data in a first memory area of the memory device. The first memory area is inaccessible by an external device. The method further includes storing encrypted secure data in a second memory area of the memory device. The second memory area is accessible by the external device. The encrypted secure data is an encrypted version of the secure data in the first memory area.

In one embodiment, the method further includes accessing the secure data from the first memory area using logic resident on the memory device, and generating the encrypted secure data from the accessed secure data using the logic.

In one embodiment, the secure data includes a main key for authenticating the memory device, and the encrypted secure data includes an encrypted main key. In this embodiment, the method may further include storing at least one spare key in the first memory area, the spare key for generating authentication information of the memory device, and storing at least one spare key index in the second memory area. The spare key index is linked to the spare key.

In one embodiment, the spare key index may correspond to a vendor of the memory device.

In one embodiment, the spare key index may be linked to the spare key by a spare key number.

In one embodiment, the method further includes storing at least one encrypted decryption key in a third memory area of the memory device. The third memory area is accessible by the external device. The encrypted decryption key is an encrypted version of a decryption key, and the decryption key is for decrypting the encrypted main key. The encrypted decryption keys may correspond to vendors of external devices.

In another embodiment of the method of operating a memory device, the method may include storing secure data in a first memory area of the memory device, and storing encrypted secure data in a second memory area of the memory device. The encrypted secure data is an encrypted version of the secure data in the first memory area. The method further includes prohibiting output of the secure data, and permitting output of the encrypted secure data.

Some example embodiments relate to a method for a memory device to generate authentication information.

In one example embodiment, the method includes generating, by the memory device, a session key based on a spare key and input received from an external device; and generating, by the memory device, authentication information based on the session key and a main key. The main key and the spare key are stored in an area of the memory device inaccessible to the external device. The method further includes outputting the authentication information to the external device.

In one embodiment, the generating a session key includes receiving a target spare key number, a spare key variant number, and a random number from the external device as input from the external device; obtaining a spare key based on the received target spare key number; encrypting the spare key based on the received spare key variant number to produce a spare key variant; and encrypting the spare key variant based on the received random number to generate the session key.

In one embodiment, the generating authentication information includes encrypting the main key using the session key to generate the authentication information.

In one embodiment, the generating a session key includes receiving a target spare key number, a spare key variant number, and a random number from the external device as input from the external device; selecting one of a plurality of spare keys stored in the area of the memory device based on the received target spare key number; encrypting the selected spare key based on the received spare key variant number to produce a spare key variant and encrypting the spare key variant based on the received random number to generate the session key.

In one embodiment, the generating authentication information includes encrypting the main key using the session key to generate the authentication information.

In one embodiment, the external device is a host device.

In another embodiment, the external device is a memory controller.

In another embodiment of the method for a memory device to generate authentication information, the method includes receiving a target spare key number, a spare key variant number, and a random number from an external device; encrypting a spare key based on the received spare key variant number to produce a spare key variant; encrypting the spare key variant based on the received random number to generate the session key; encrypting a main key stored at the memory device using the session key to generate the authentication information; and outputting the authentication information.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1:
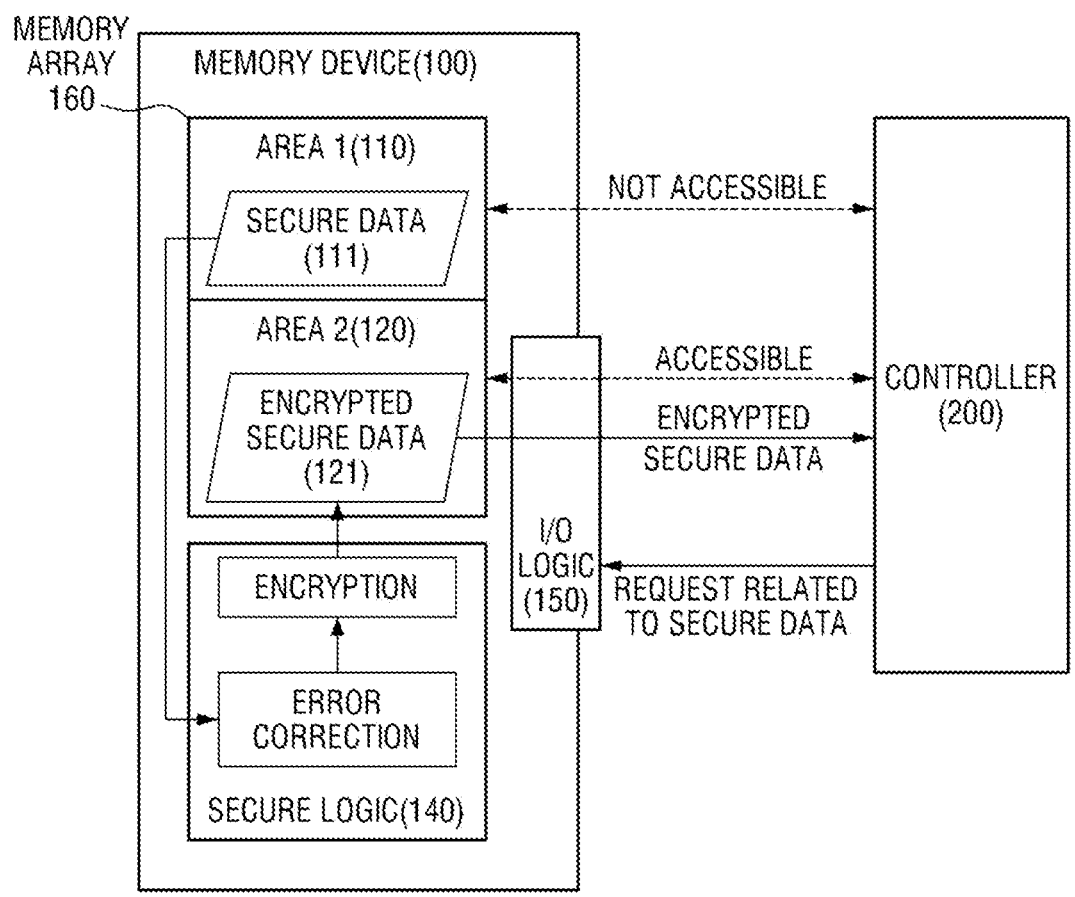
FIGS. 1 and 2 are diagrams illustrating a memory system including a memory element which protects secure data according to a first embodiment.

Advantages and features of the example embodiments and methods of accomplishing the same may be understood more readily by reference to the following detailed description and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, sizes and relative sizes of elements may be exaggerated for clarity. Like reference numerals refer to like elements throughout the specification. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated elements, but do not preclude the presence or addition of one or more other elements thereof.

It will be understood that, although the terms first, second, third, etc., may be used herein to describe various elements, these elements should not be limited by these terms.

These terms are only used to distinguish one element from another element. Thus, a first element discussed below could be termed a second element without departing from the teachings of the present invention.

Embodiments of the invention are described herein with reference to schematic illustrations of idealized embodiments of the invention. As such, variations from the shapes of the illustrations as a result, for example, of manufacturing techniques, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a memory device 100 which protects secure data according to a first embodiment of the present invention will be described with reference to FIGS. 1 through 3.

The memory device 100 may be a nonvolatile memory and may be a chip or package that uses a NAND-FLASH memory, a NOR-FLASH memory, a phase change random access memory (PRAM), a magnetic random access memory (MRAM), or a resistive random access memory (RRAM) as a storage medium. Examples of the package that may include the memory device 100 include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi Chip Package (MCP), Wafer-level Fabricated Package (WFP), and Wafer-level Processed Stack Package (WSP).

Referring to FIG. 1 the memory device 100 according to the current embodiment includes a secure logic 140, a first memory area 100, and an input/output (I/O) logic 150. The memory device 100 may include one or more memory areas in addition to the first memory area 110. In FIG. 1, a second memory area 120 is illustrated in addition to the first memory area 110. In FIG. 2, a second memory area 120 and a third memory area 130 are illustrated in addition to a first memory area 110. The memory devices 100 of FIGS. 1 and 2 may further include a user area which stores user data and that is not shown in FIGS. 1 and 2. The memory areas of the memory device 100 shown in FIGS. 1 and 2 may use the same type of memory cells. Otherwise, the first memory area 110 may be of a different type from that of the user area. That is, the first memory area 110 may be a one-time-program memory into which data can be programmed only once, and the user area may be a multi-time-program memory into which data can be programmed a plurality of times.

The first memory area 110 cannot be accessed in the same way that other memory areas are accessed. An external device connected to the memory device 100 cannot read data stored in the first memory area 110. The external device may be a controller 200 or a host device 300 (in FIG. 3), which is connected to the memory device 100 and controls operation of the memory device 100. The external device is not a device used during manufacture such as test equipment. Instead, the external device is a device that operates with the memory device 100 after sale of the memory device 100.

Figure 10:
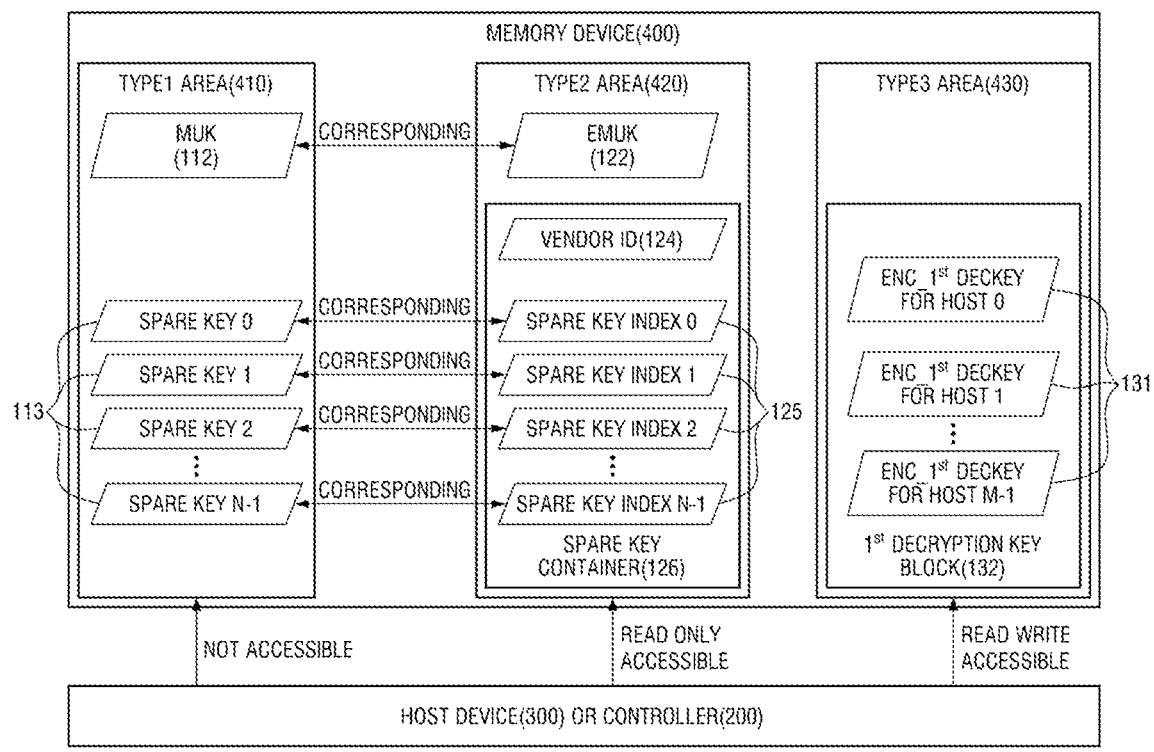
FIG. 10 is a diagram illustrating a memory device which protects an MUK according to a sixth embodiment.

Since the external device connected to the memory device 100 cannot read the data stored in the first memory area 110, the first memory area 110 is illustrated in FIGS. 1 through 4 as being "NOT ACCESSIBLE" by the controller 200 or the host device 300. When the first memory area 110 is described or illustrated as being "NOT ACCESSIBLE", it can be understood that the external device is unable to read the data stored in the first memory area 110. In FIG. 10, a type1 area 410 is also illustrated as being "NOT ACCESSIBLE" by the host device 300 or the controller 200. Here, "NOT ACCESSIBLE" for the type1 area 410 has the same meaning as "NOT ACCESSIBLE" for the first memory area 110.

The data of the first memory area 110 may only be read-only accessible by the secure logic 140. In addition, the memory device 100 may include a circuit designed to output the data stored in the first memory area 110 only through the secure logic 140.

Since the data stored in the first memory area 110 can be accessed only by the secure logic 140, the secure logic 140 may provide an error correction function for correcting an error which may occur when a different value from the data stored in the first memory area 110 is read by the secure logic 140. In these and the other embodiments, the secure logic may be a hardware circuit or the specific purpose machine such a programmed processor. According to some embodiments, an error correction circuit (not shown) connected to the first memory area 110 may perform the error correction function, and the data stored in the first memory area 110 may be sent to the secure logic 140 after being error-corrected by the error correction circuit. The error correction circuit may be a flip-flop circuit. The error correction function can be fully accomplished by applying a conventional error correction technique, and thus a detailed description thereof will be omitted.

Secure data 111 is stored in the first memory area 110. The I/O logic 150 interfaces data input/output with the host device 300 or the controller 200.

The I/O logic 150 may interpret commands and address information received from the host device 300 or the controller 200 and transmit data output from a memory array 160 to the host device 300 or the controller 200. The host device may be any device having a processor such as a computer, a tablet, a cell phone, a media player, etc.

Figure 2:
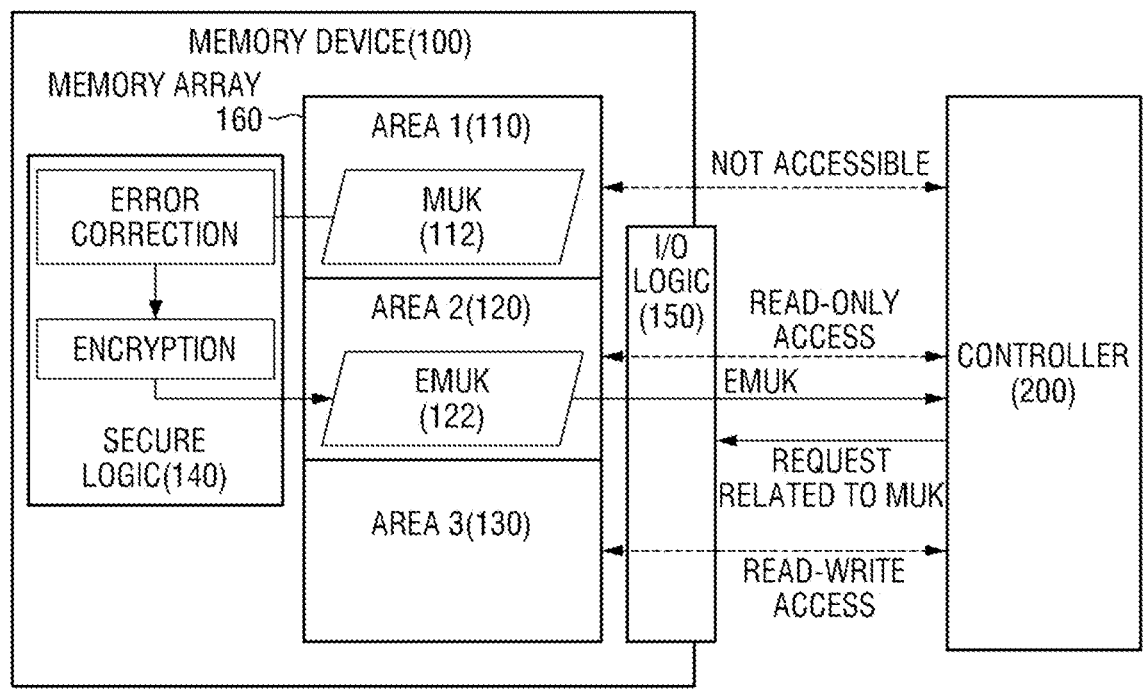
Figure 4:
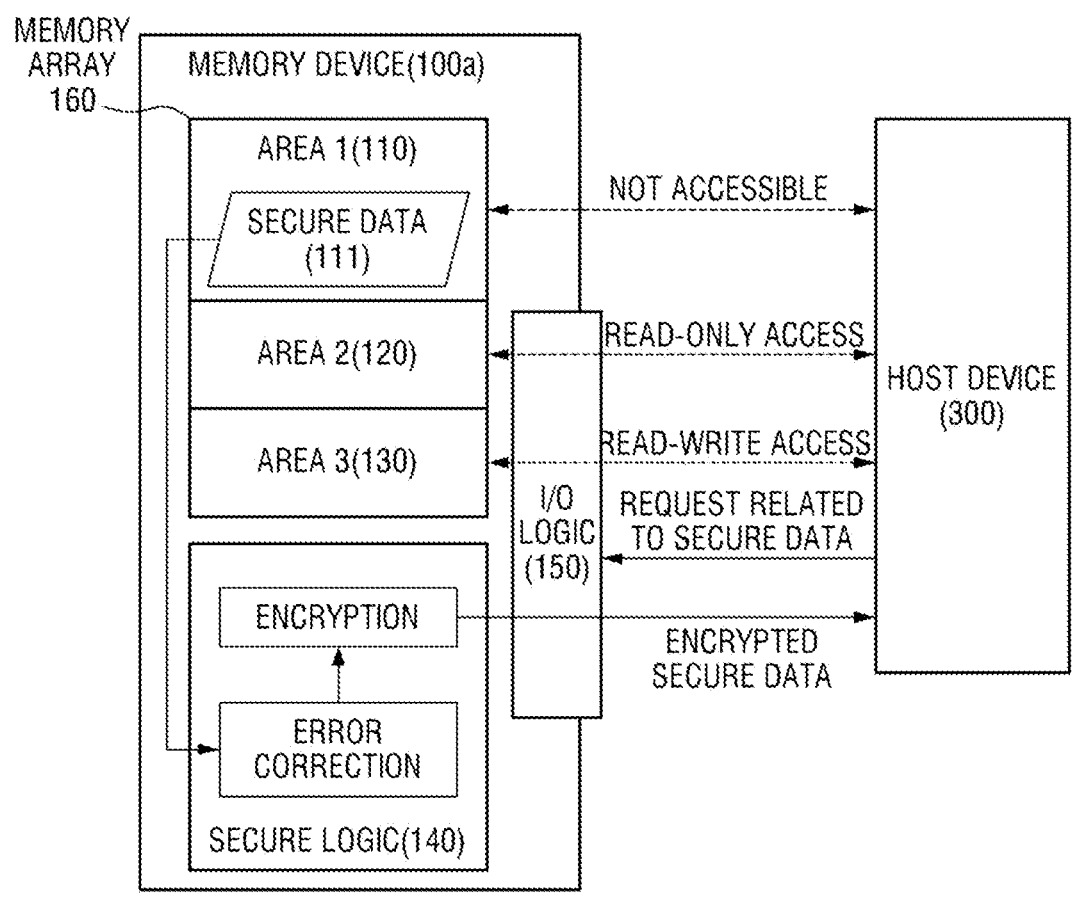
FIG. 4 is a diagram illustrating an electronic device including a memory element which protects secure data according to a second embodiment.

In FIGS. 1 and 2, the memory devices 100 are connected to the controller 200. However, in some embodiments, the memory devices 100 may be connected directly to the host device 300 without via the controller 200 as shown in FIG. 4. In this case, the host device 300 performs the operation of the controller 200.

The memory device 100 according to the current embodiment stores encrypted secure data 121, which is obtained by encrypting secure data 111 stored in the first memory area 110, in the second memory area 120 and allows only the encrypted secure data 121 stored in the second memory area 120 to be output to the host device 300. The second memory area 120 can be accessed by the controller 200 or the host device 300. In one embodiment, the second memory area 120 is only readable by an external device (e.g., host device 300 and/or controller 200). As mentioned earlier, the first memory area 110 is "NOT ACCESSIBLE" by the controller 200 and is read-only accessible by the secure logic 140.

The controller 200 receives the encrypted secure data 121 from the memory device 100 according to the current embodiment as follows.

First, the memory device receives a request related to the secure data 111 from the memory controller 200. When the encrypted secure data 121 is not stored in the second memory area 120, the secure logic 140 reads the secure data 111, corrects errors of the read secure data 111, and encrypts the secure data 111. An encryption algorithm and an encryption key used to encrypt the secure data 111 are not limited to a particular encryption algorithm and a particular encryption key. However, a symmetric-key encryption algorithm that uses the same key for both encryption and decryption, such as an advanced encryption standard (AES) encryption algorithm, may preferably be used. Next, the secure logic 140 stores the encrypted secure data 121 in the second memory area 120.

The secure logic 140 may include one or more encryption engines. At least one of the encryption engines may perform a symmetric key encryption algorithm. The secure logic 140 may encrypt the secure data 111 using one of the encryption engines.

When the controller 200 inputs a request related to the secure data 111 to the I/O logic 150, the I/O logic 150 reads and outputs the encrypted secure data 121 stored in the second memory area 120. The request may be a request for output of the secure data 111 or a request for initiation of a procedure for authenticating the memory element 100 using the secure data 111. The request may be made by the controller 200 or may be made by the controller 200 at the request of the host device 300.

Referring to FIG. 2, the secure data 111 according to the current embodiment may be a memory unique key (MUK) 112 allocated to the memory device 100. That is, the memory device 100 may store its MUK 112 in the first memory area 110 and protect the MUK 112 in order to prevent the MUK 112 from being leaked in an unencrypted state. This will be described in more detail with reference to FIG. 2.

The MUK 112 may be data stored in the memory device 100 by a vendor of the memory device 100 when the memory device 100 is manufactured. That is, the MUK 112 may have already been stored in the memory device 100 by the time the memory device 100 is released to the market.

Referring to FIG. 2, the controller 200 receives an encrypted memory unique key (EMUK) 122 as the encrypted secure data 121 from the memory device 100 according to the current embodiment as follows.

When the EMUK 122 is not stored in the second memory area 120, the secure logic 140 stores the EMUK 122, which is obtained by reading, error-correcting and encrypting the MUK 112, in the second memory area 120.

Then, when the controller 200 inputs a request related to the MUK 112 to the I/O logic 150, the I/O logic 150 reads and outputs the EMUK 122 stored in the second memory area 120. In order to prevent the EMUK 122 from being modified or deleted without permission, the second memory area 120 may only be read-only accessible by the controller 200.

In FIG. 2, the secure logic 140 stores the EMUK 122 in the second memory area 120. However, the EMUK 122 can also be stored together with the MUK 112 by the vendor of the memory device 100 in the process of manufacturing the memory device 100. Preferably MUK in area 1 and EMUK in area 2 are programmed by the manufacturer before coming out to the market. If the memory device 100 is released after the EMUK 122 is stored in the second memory area 120 of the memory device 100, the secure logic 140 does not encrypt the MUK 112 and store the EMUK 122 in the second memory area 120.

An operation method of the memory device 100 according to the current embodiment will now be described with reference to FIG. 3. In FIG. 3, the operation of the memory device 100 of FIG. 1 is illustrated. For simplicity, a repetitive description of the same components and operations as those already described above will be omitted from the description of FIG. 3.

Figure 3:
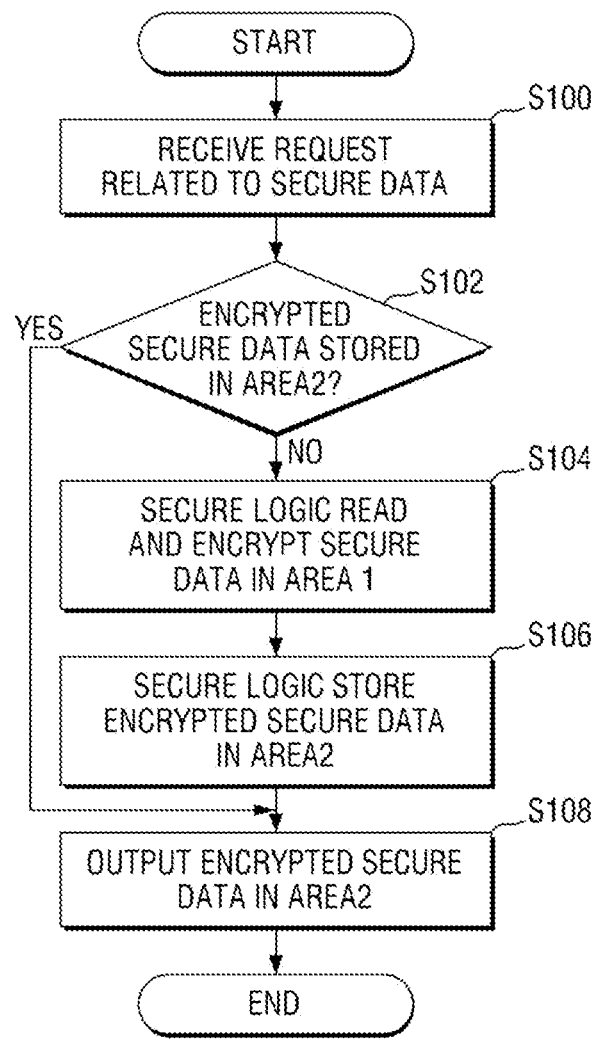
FIG. 3 is a flowchart illustrating an operation of the memory element which protects secure data according to the first embodiment.

Referring to FIG. 3, the memory device 100 receives a request related to the secure data 111 (operation S100) and determines whether the encrypted secure data 121 is stored in the second memory area 120 (operation S102). If the encrypted secure data 121 is stored in the second memory area 120, the memory device 100 outputs the encrypted secure data 121 stored in the second memory area 120 (operation S108). On the other hand, if the encrypted secure data 121 is not stored in the second memory area 120, the secure logic 140 reads the secure data 111 stored in the first memory area 110 and encrypts the read secure data 111 (operation S104). Then, the secure logic 140 stores the encrypted secure data 121 in the second memory area 120 (operation S106) and outputs the encrypted secure data 121 stored in the second memory area 120 (operation S108).

If the vendor of a memory device has stored the secure data and the encrypted secure data in a first memory area 110 and a second memory area 120, respectively, in the process of manufacturing the memory device, the memory device may output the encrypted secure data 122 of the second memory area when receiving the request related to the secure data.

According to the current embodiment, even if the controller 200 inputs a request related to the secure data 111 stored in the first memory area 110, the memory device 100 does not output the secure data 111 but outputs the encrypted secure data 121 stored in the second memory area 120, thereby preventing the leakage of the secure data 111. Thus, in any circumstance, the secure data 111 cannot be output as stored in the first memory area 110 and is only output from the memory device 100 in an encrypted state.

Hereinafter, a memory device 100a which protects secure data according to a second embodiment will be described with reference to FIG. 4. The memory device 100a may be a nonvolatile memory and may be a chip or package.

The memory device 100a according to the current embodiment is connected directly to a host device 300 without via a controller 200. In addition, a secure logic 140 of the memory element 100 encrypts the secure data 111 stored in a first memory area 110 and outputs the encrypted secure data 121. The memory device 100a according to the current embodiment operates as follows.

When the host device 300 inputs a request related to the secure data 111 to an I/O logic 150, the I/O logic 150 may send the request to the secure logic 140. Here, the request related to the secure data 111 may be a request for the initiation of an authentication procedure using the secure data 111 or a request for output of the secure data 111. The I/O logic 150 may determine whether the input request is related to the secure data 111 by interpreting a read data address attached to the request or determining whether the request matches a predetermined command related to the secure data 111. That is, the I/O logic 150 according to the current embodiment may send a response to the request related to the secure data 111 of the first memory area 110 to the host device 300 via the secure logic 140. This is because the first memory area 110 can be accessed only by the secure logic 140.

After receiving the request from the I/O logic 150, the secure logic 140 receives the secure data 111 from the first memory area 110, error-corrects the secure data 111, and encrypts the secure data 111. As described above, according to some embodiments, the secure data 111 can also be provided to the secure logic 140 after being error-corrected by the error correction circuit. In this case, the secure logic 140 encrypts the secure data 111 immediately.

The secure logic 140 provides the encrypted secure data 121 to the I/O logic 150, so that the encrypted secure data 121 can be output to the host device 300.

Figure 5:
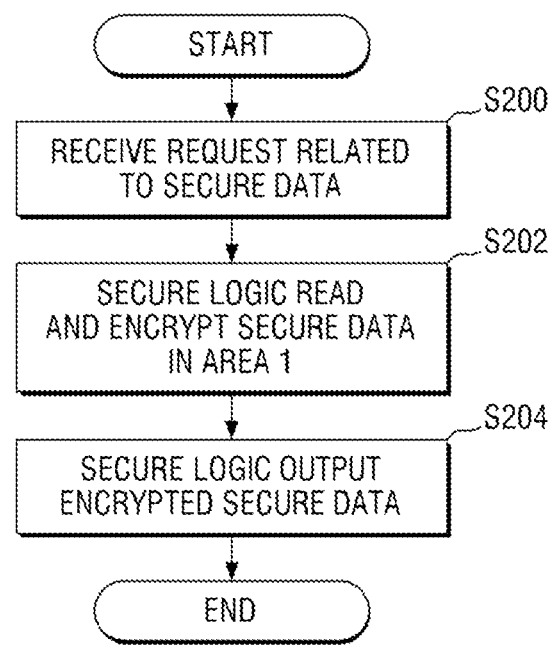
FIG. 5 is a flowchart illustrating the operation of the memory element which protects secure data according to the second embodiment.

An operation method of the memory device 100a according to the current embodiment will now be described with reference to FIG. 5. In FIG. 5, the operation of the memory element 100a of FIG. 4 is illustrated. For simplicity, a repetitive description of the same components and operations as those already described above will be omitted from the description of FIG. 5.

Referring to FIG. 5, when the memory device 100a receives a request related to the secure data 111 (operation S200), the secure logic 140 reads the secure data 111 stored in the first memory area 110, encrypts the received secure data 111 (operation S202), and outputs the encrypted secure data 121 (operation S204). It will be appreciated that in this embodiment, the encrypted secure data 121 is not stored in the memory device 100a, but could be stored in the memory device 100a.

As described above, the secure data 111 stored in the first memory area 110 of the memory device 100a according to the current embodiment is accessible only by the secure logic 140 within the memory device 100a. The secure logic 140 reads the secure data 111, encrypts the read secure data 111, and then outputs the encrypted secure data 121. Therefore, in any circumstance, the secure data 111 is output from the memory element 100 in an encrypted state. That is, the memory device 100a according to the current embodiment can significantly reduce the probability that the secure data 111 will be leaked. The secure data stored in the first memory area 110 may be a MUK 122 that is allocated to each memory device 100a.

Each of the memory devices 100, 100a may include a memory array 160. The memory array 160 includes a second memory area which is read-only accessible by the host device 300 or the controller 200 and a third memory area which is read-write accessible by the host device 300 or the controller 200. The memory array may include all of the first, second, and third memory areas. Alternatively, the first memory area 110 may not be included in the memory array 160 but may be separated from the memory array 160. As in FIGS. 1 and 2, the second memory area may be programmed by a secure logic 140.

Hereinafter, a memory device 100 which protects a MUK according to a third embodiment will be described with reference to FIGS. 6 and 7. The memory device 100 according to the current embodiment may further include a third memory area 130 (see FIGS. 2 and 4), which is read-write accessible by a host 300 or a controller 200. Specifically, the memory device 100 according to the current embodiment may include a first memory area 110 which is accessible by a secure logic 140, a second memory area 120 which is read-only accessible by an external device, and the third memory area 130 which is read-write accessible by the external device. A MUK 112 may be stored in the first memory area 110, and an EMUK 122 may be stored in the second memory area 120.

To perform a certain operation using the MUK 112, the host device 300 obtains the MUK 112 by decrypting the EMUK 122. A decryption key used to decrypt the EMUK 122 will hereinafter be referred to as a first decryption key.

The memory device 100 according to the current embodiment may store an encrypted first decryption key 131, which is obtained by encrypting the first decryption key, in the third memory area 130. That is, the memory device 100 does not store the first decryption key and stores the encrypted first decryption key only. This is because the EMUK 122 can be easily decrypted into the MUK 112 using the first decryption key if the first decryption key is stored in the memory element 100. A memory vendor or a vendor which assembles a card using a memory device 100 can program or store the encrypted first decryption key 131 into the third memory area.

A decryption key used to decrypt the encrypted first decryption key 131 is a second decryption key 301 stored in the host device 300. The second decryption key may have a unique value for each host device vendor or for each host device.

Figure 6:
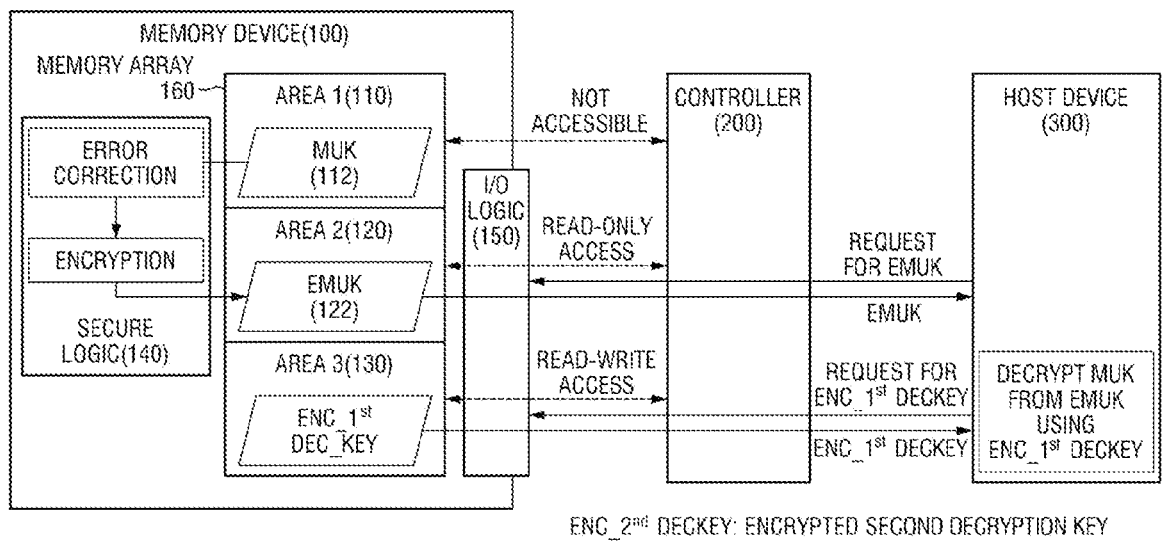
FIG. 6 is a diagram illustrating an electronic device including a memory element which protects a memory unique key (MUK) according to a third embodiment.
Figure 7:
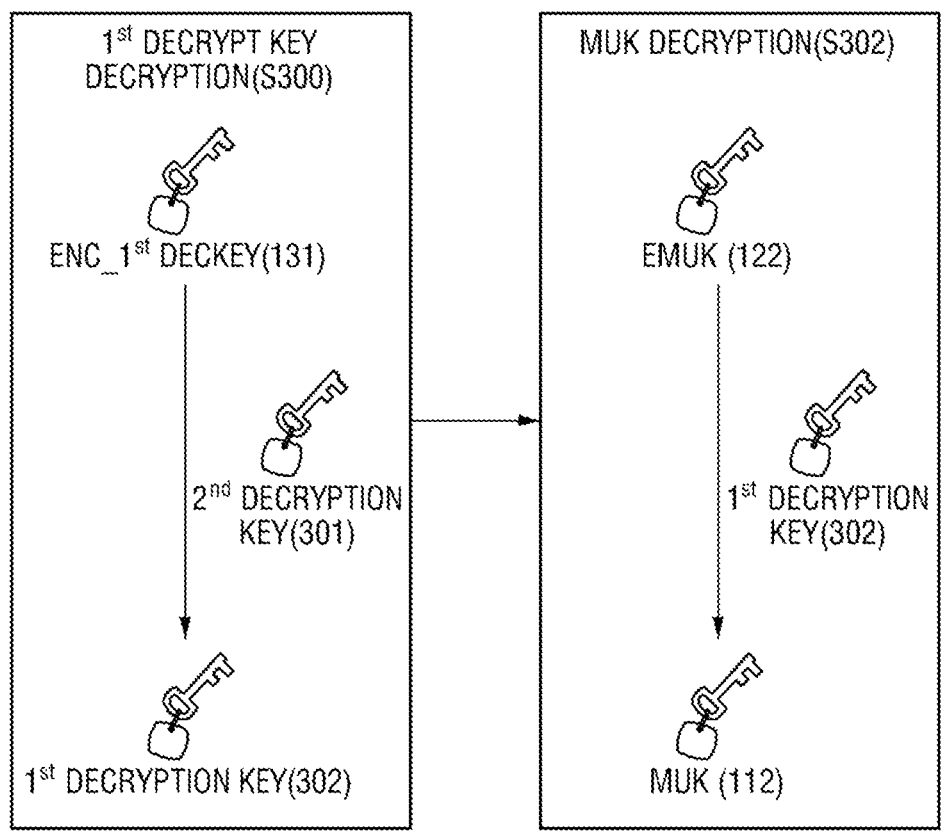
FIG. 7 is a diagram illustrating a process in which a host device obtains an MUK according to the third embodiment.

Referring to FIG. 6, the host device 300 requests the EMUK 122 through the controller 200 and receives the requested EMUK 122. Likewise, the host device 300 requests the encrypted first decryption key 131 stored in the third memory area 130 through the controller 200 and receives the requested encrypted first decryption key 131. Then, referring to FIG. 7, the host device 300 decrypts the encrypted first decryption key 131 into the first decryption key 302 using the second decryption key 301 (operation S300) and decrypts the EMUK 122 into the MUK 112 using the first decryption key 302 (operation S302). Hereinafter, encryption or decryption using 'A' may be understood as encryption or decryption using 'A' as an encryption key or a decryption key.

The first decryption key 302 may have the same value as an encryption key used by a memory vendor to generate the EMUK 122 by encrypting the MUK 112.

In a user area of a memory array 160 which is not shown in FIG. 6, data encrypted using an encryption key, which is generated based on the MUK 112, may be stored. Encrypting data using an encryption key generated based on the MUK 112 will be described in more detail later in another embodiment.

Figure 8:
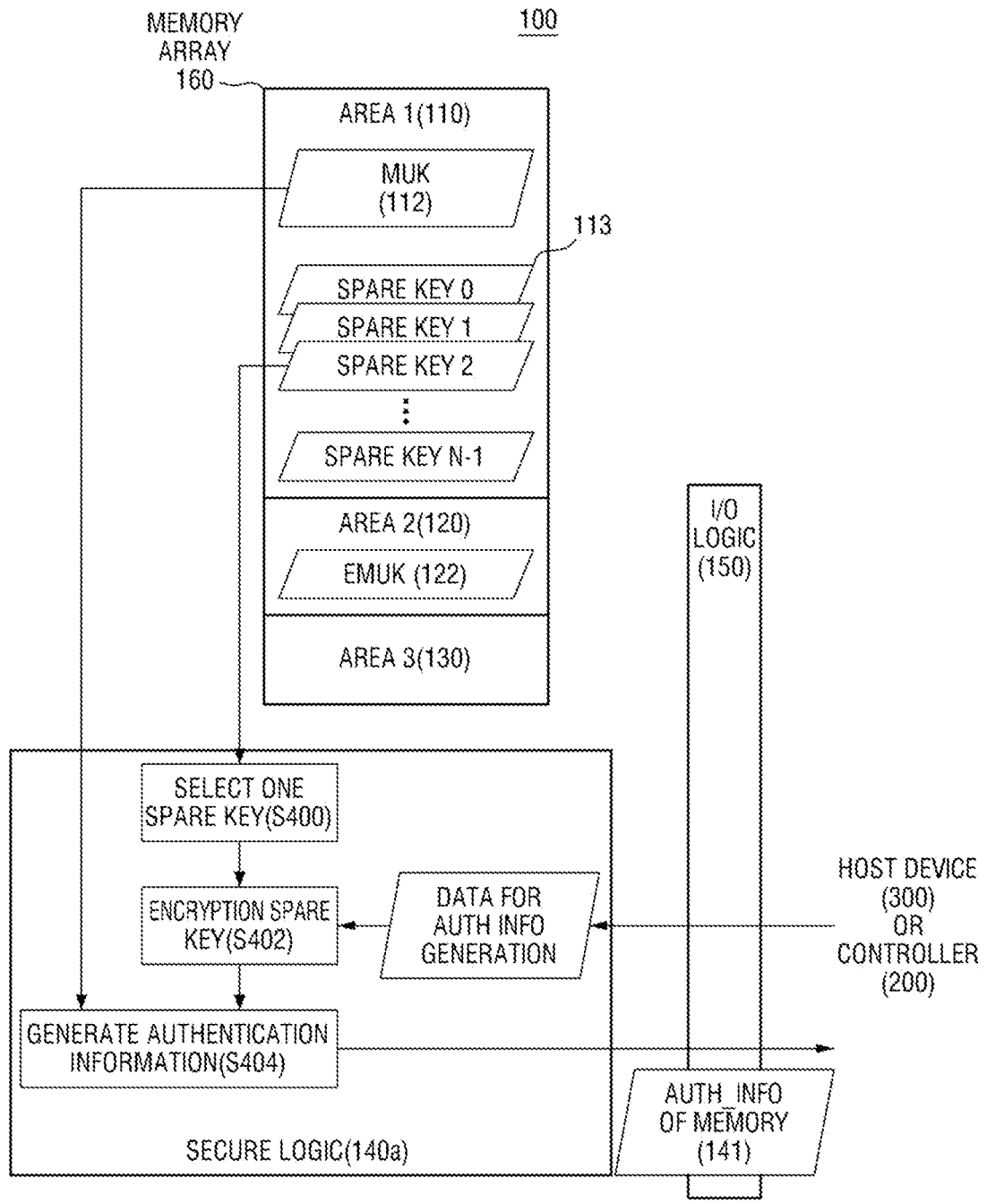
FIG. 8 is a diagram illustrating a memory element which generates authentication information using an MUK according to a fourth embodiment.

Hereinafter, a memory device 100 which generates authentication information using an MUK according to a fourth embodiment will be described with reference to FIG. 8. The memory device 100 according to the current embodiment generates authentication information using a MUK 112 stored in a first memory area 110 in order to be authenticated by an external device such as a host device 300 or a controller 200 and provides the generated authentication information to the external device. The memory device 100 may generate the authentication information as follows.

The memory device 100 according to the current embodiment stores the MUK 112 and a plurality of spare keys 113 in the first memory area 110. Since the first memory area 110 is accessible only by a secure logic 140a, the spare keys 113 are also accessible only by the secure logic 140a. The secure logic 140a generates authentication information 141 of a memory device based on data obtained by encrypting the MUK 112. Specifically, the secure logic 140a encrypts the MUK 112 using a second encryption key, which is different from a first encryption key used to encrypt the MUK 112, into an EMUK 122 and generates the authentication information 141 of the memory device based on the encrypted data.

The second encryption key may be generated based on data obtained by encrypting one of the spare keys 113. To this end, the secure logic 140a selects one of the spare keys 113 (operation S400) and encrypts the selected spare key (operation S402). In the selecting of one of the spare keys 113 (operation S400), the secure logic 140 may select one of the spare keys 113 based on a predetermined standard or based on spare key selection information provided by the host device 300 or the controller 200. The secure logic 140a may be configured to select a first spare key SPARE KEY 0 in response to the spare key selection information in order to generate the authentication information 141 of the memory device. In the encrypting of the selected spare key (operation S402), the secure logic 140a may encrypt the selected spare key using a key generated based on data for authentication information generation, which is received from the host device 300 or the controller 200, as an encryption key. A specific example of this will be described in detail below with respect to FIG. 13. The second encryption key may be obtained based on data generated as a result of encrypting the selected spare key (operation S402).

The secure logic 140a generates the authentication information 141 of the memory device based on the data obtained by encrypting the MUK 112 using the second encryption key (operation S404).

In summary, according to the current embodiment, the secure logic 140a generates a second encryption key, which is different from a first encryption key used to encrypt an MUK into an EMUK, based on one of a plurality of spare keys and a key for authentication information generation, which is received from an external device, and generates authentication information by encrypting the MUK using the second encryption key. The secure logic 140a may include one or more encryption engines (not shown), and one of the encryption engines may be used to encrypt the MUK using the second encryption key.

According to the current embodiment, the authentication information 141 of the memory device is generated using the MUK 112 and the spare keys 113 which are stored in the memory device 100 and are not leaked to the outside. Since source data needed to generate the authentication information 141 of the memory device is not leaked to the outside, the probability that the authentication information 141 of the memory device will be manipulated is sharply reduced. In addition, since data provided by the host device 300 is reflected in the process of generating the authentication information 141 of the memory device, various methods can be used to authenticate the memory device, and different authentication information 141 can be generated whenever the memory device is authenticated, thereby further reducing the probability that the authentication information 141 will be manipulated.

Figure 9:
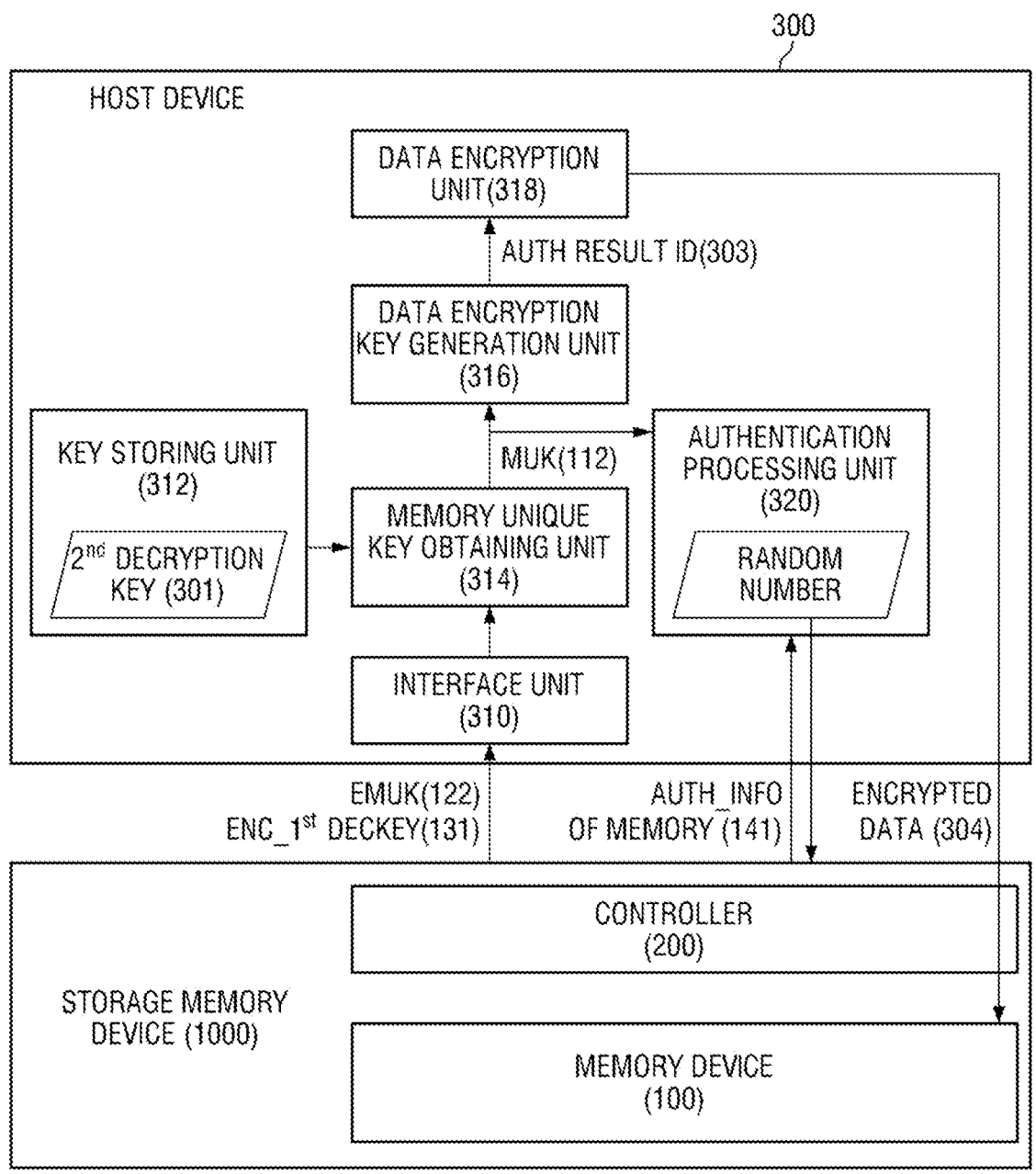
FIG. 9 is a diagram illustrating a host device which authenticates a memory device, encrypts data when the memory device is successfully authenticated, and stores the encrypted data in the memory device according to a fifth embodiment.

Hereinafter, a host device 300 according to a fifth embodiment will be described with reference to FIG. 9. The host device 300 according to the current embodiment authenticates a memory device, encrypts data when the memory device is authenticated successfully, and stores the encrypted data in the memory device. Referring to FIG. 9, the host device 300 according to the current embodiment includes an interface unit 310, a key storing unit 312, and an MUK obtaining unit 314. A storage memory device 1000 includes memory device 100, and controller 200 for controlling the memory device 100. The storage memory device 1000 includes memory device 100a which is depicted in FIG. 4, or memory device 400 which is depicted in FIG. 10, instead of the memory device 100.

The host device 300, which includes the interface unit 310, the key storing unit 312 and the MUK obtaining unit 314, may obtain an MUK 112 by decrypting an EMUK 122 received from a storage memory device 1000.

The interface unit 310 receives from the storage memory device 1000 included in the storage memory device 1000, the EMUK 122 which is obtained by encrypting the MUK of the storage memory device 1000 and the encrypted first decryption key 131 which is obtained by encrypting a first decryption key 302 used to decrypt the EMUK 122.

The key storing unit 312 stores a second decryption key 301 used to decrypt the encrypted first decryption key 131. The second decryption key 301 may have a unique value for each host device vendor or for each host device 300.

The MUK obtaining unit 314 obtains the first decryption key 302 by decrypting the encrypted first decryption key 131 using the second decryption key 301 and obtains the MUK 112 by decrypting the EMUK 122 using the first decryption key 302. The MUK obtaining unit 314 may include one or more decryption engines. One of the decryption engines may obtain the first decryption key 302 from the encrypted first decryption key 131 by performing a symmetric decryption algorithm, and another one of the decryption engines may obtain the MUK 112 from the EMUK 122 by using the first decryption key 302. Decryption algorithms used to obtain the first decryption key 302 and the MUK 112 may be the same or different.

The host device 300 according to the current embodiment authenticates the storage memory device 1000 using the MUK 112 as follows. When the host device 300 authenticates the storage memory device 1000, the host device 300 determines whether the storage memory device 1000 generates authentication information that meets a specific standard of the host device 300. If the host device 300 generates authentication information according to standard A, the host device 300 may determine whether the storage memory device 1000 also generates authentication information according to standard A. In doing so, the host device 300 determines whether the storage memory device 1000 operates according to standard A and performs a different operation based on the determination result. A description of the process in which the storage memory device 1000 generates authentication information can be found in the description of the fourth embodiment with reference to FIG. 8.

The host device 300 which authenticates the storage memory device 1000 may further include an authentication processing unit 320. The authentication processing unit 320 generates authentication information of the host device 300 based on the MUK 112 obtained by the MUK obtaining unit 314, receives authentication information 141 of the storage memory device 1000 from the memory device 100 included in the storage memory device 1000 via the interface unit 310, and authenticates the storage memory device 1000 by comparing the authentication information of the host device 300 and the authentication information 141 of the storage memory device 1000.

The authentication processing unit 320 may generate a random number and generate the authentication information of the host device 300 using the random number.

The random number is also provided to the storage memory device 1000. Thus, the authentication information 141 of the storage memory device 1000 may have been generated using the random number. The authentication processing unit 320 generates the authentication information of the host device 300 based on the MUK 112 using the random number and forces the storage memory device 1000 to generate the authentication information 141 using the random number. Accordingly, different authentication information can be generated each time the storage memory device 1000 is authenticated because of using a random number. Generating different authentication information each time the storage memory device 1000 is authenticated increases authentication security.

The host device 300 according to the current embodiment generates an encryption key using the MUK 112 and encrypts user data like a movie or music using the encryption key. Since the host device 300 according to the current embodiment encrypts data, which is to be stored in the storage memory device 1000, using an encryption key generated based on the MUK of the storage memory device 1000, even if the encrypted data is copied to a storage device other than the storage memory device 1000, makes it difficult if not impossible to decrypt the copied data.

For example, the host device 300 may symmetrically encrypt movie contents using key A, which is generated based on an MUK of a first memory device, and store the encrypted movie contents in a first memory device 100. In this case, even if the encrypted movie contents are copied to a second memory device which is different from the first memory device, the copied movie contents cannot be decrypted and thus cannot be reproduced. This is because the host device 300 will generate key B based on an MUK of the second memory device, which is different from the MUK of the first memory device, in order to decrypt the encrypted movie contents coped to the second memory device. Thus, the keys A and B will obviously be different from each other.

Since a MUK of a storage device, in which encrypted data is to be stored, is never leaked in an unencrypted state in the current embodiment, it can be understood that the current embodiment provides a method of generating a data encryption key that can deter or prevent piracy.

The host device 300 according to the current embodiment further includes a data encryption key generation unit 316 which generates a data encryption key based on the obtained MUK 112. The data encryption key will hereinafter be referred to as an authentication result ID 303.

The host device 300 according to the current embodiment may further include a data encryption unit 318, which encrypts target data using the authentication result ID 303.

In addition, the data encryption unit 318 may further include a decryption unit (not shown) that decrypts data, which is encrypted using a symmetric encryption algorithm, using the authentication result ID 303. The encrypted target data is provided to the memory device 1000 via the interface unit 310 and stored in the user area of the memory element 100.

In summary, the host device 300 according to the current embodiment obtains the EMUK 122 from storage memory device 1000, generates the MUK 112, authenticates the storage memory device 1000 using the MUK 112, and generates the authentication result ID 303 for data encryption. Data encrypted using the authentication result ID 303 is stored in the memory device 100, which stores the MUK 112.

Hereinafter, a memory device 400 which protects an MUK according to a sixth embodiment will be described with reference to FIG. 10. Referring to FIG. 10, the storage memory device 400 according to the current embodiment may include three storage areas, that is, a type1 area 410, a type2 area 420, and a type3 area 430.

The type1 area 410 stores a MUK 112 and is accessed by a host device 300 or a controller 200 through a secure logic (not shown). That is, although not shown in FIG. 10, the type1 area 410 is read-only accessible by the secure logic (not shown). The secure logic reads data stored in the type1 area 410 and encrypts the read data. The type1 area 410 may further store a plurality of spare keys 113. The spare keys 113 may include first through N$^{th}$ spare keys Spare Key#0 through Spare Key#N−1 where N is a desired (or, alternatively a predetermined) number of spare keys.

The type2 area 420 is read-only accessible by the host device 300 or the controller 200 and stores an EMUK 122 obtained by encrypting the MUK 112. The type2 area 420 may further store a spare key container 126, which includes a vendor ID 124 of a memory device 400 and a plurality of spare key indices 125 corresponding respectively to the spare keys 113. Here, Spare Key Index#0 corresponds to Spare Key#0, Spare Key Index#1 corresponds to Spare Key#1, Spare Key Index#2 corresponds to Spare Key#2, . . . Spare Key Index#N−1 corresponds to Spare Key#N−1. The spare key indices of the spare key container 126 may be output to the host device 300, so that the host device 300 can generate its authentication information. According to an embodiment, the spare key container 126 may be stored in the type3 area 430 instead of the type2 area 420.

Each spare key index is data that contains a factor for each spare key. If each spare key index is interpreted in combination with additional information, a corresponding spare key can be obtained. As described above, the MUK 112 can be obtained from the EMUK 122. Therefore, although the memory device 400 according to the current embodiment does not output data stored in the type1 area 410, it provides data, which can be decrypted to obtain the data stored in the type1 area 410, through the type2 area 420.

The EMUK 122 can be used in an authentication process of the memory device 400 by the host device 300. A spare key 113 selected by the host device 300 can also be used in the authentication process of the memory device 400 by the host device 300.

The MUK and the spare keys 113 may be programmed by a memory vendor in the process of manufacturing a memory element, particularly, in a wafer state. The EMUK and the spare key indices 125 may also be programmed by the memory vendor in the wafer state.

Lastly, the type3 area 430 is read-write accessible by the host device 300 or the controller 200. The type3 area 430 may further store a first decryption key block 132, which includes a plurality of encrypted first decryption keys 131. Here, each of the encrypted first decryption keys 131 may be allocated to a corresponding host device vendor. For example, encrypted first decryption key #0 may be allocated to host device vendor X, and encrypted first decryption key #1 may be allocated to host device vendor Y.

As described above, a first decryption key is used to decrypt the EMUK 122 into the MUK 112. Thus, the first decryption key block 132 and the EMUK 122 may be output to the host device 300, so that the host device 300 can obtain the MUK 112.

The first decryption key block 132 stored in the type3 area 430 can be programmed by a vendor which manufactures a memory card or a universal serial bus (USB) memory using the memory element.

Hereinafter, a storage memory device 400a which protects an MUK according to a seventh embodiment of the present invention will be described with reference to FIG. 11. The storage memory device 400a according to this embodiment includes two or more memory devices. For example, the storage memory device 400a illustrated in FIG. 11 includes four memory devices 401 through 404. The storage capacity of the storage memory device 400a is the sum of storage capacities of the memory devices 401 through 404 included in the memory device 400a.

Each of the memory devices 401 through 404 included in the memory device 400a may be a nonvolatile memory and may be a chip or package that uses a NAND-FLASH memory, a NOR-FLASH memory, a PRAM, an MRAM, or an RRAM as a storage medium. The memory devices 401 through 404 may be mounted on a substrate (not shown) included in the memory device 400a.

The memory devices 401 through 404 included in one memory device 400a may be nonvolatile memories of the same or different types and may have the same or different storage capacities.

The memory devices 401 through 404 included in one memory device 400a are regarded as one storage device by an external device that uses the memory device 400a.

Figure 11:
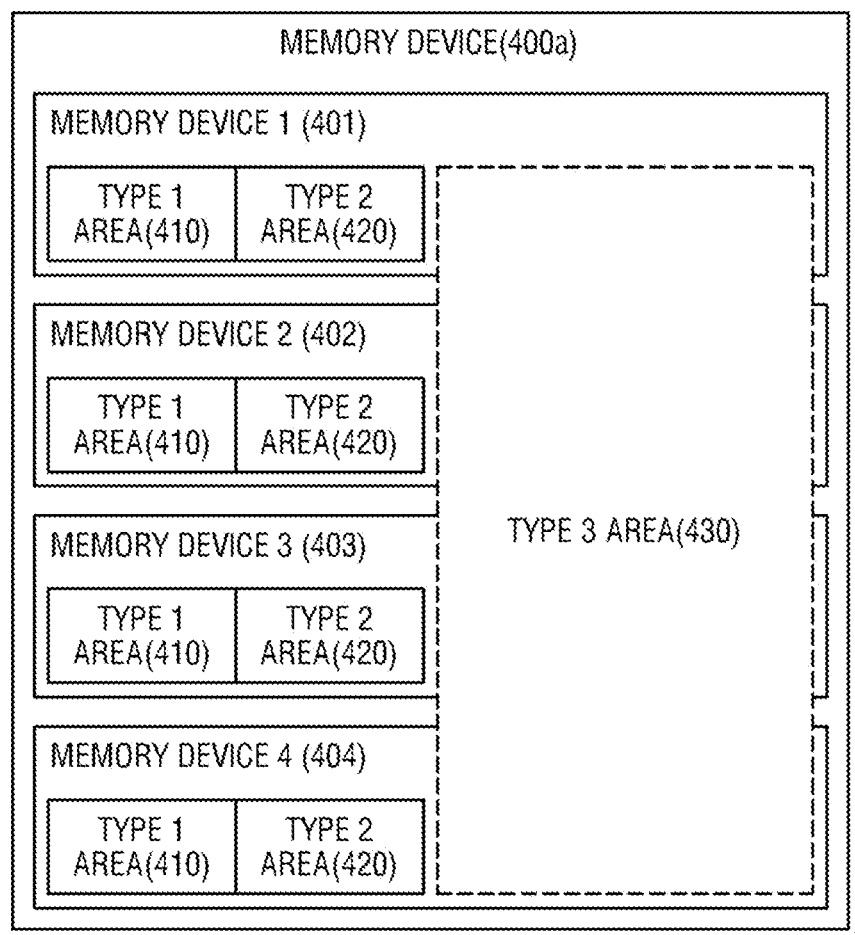
FIG. 11 is a diagram illustrating a memory device which protects an MUK according to a seventh embodiment.

Referring to FIG. 11, each of the memory devices 401 through 404 included in the memory device 400a may include a type1 area 410 and a type2 area 420. On the other hand, a type3 area 430 may be formed by all memory devices 401 through 404 included in the memory device 400a. That is, the type3 area 430 may be one logical storage space composed of storage spaces included in the physically separate memory devices 401 through 404.

Unlike the memory devices 401 through 404 included in the memory device 400a of FIG. 11, each memory element included in a memory device according to an embodiment may include a type1 area, a type2 area, and a type3 area. In addition, the memory device 400a according to the current embodiment may further include a user area formed by all memory elements included therein. That is, the user area may be one logical storage space composed of storage spaces included in the physically separate memory elements. The user area may store user data provided by an external device and may be a read-write accessible area.

Whether an external device can access each of the type1 area 410, the type2 area 420 and the type3 area 430 and data stored in each of the type1 area 410, the type2 area 420 and the type3 area 430 have already been described above in the sixth embodiment, and thus a repetitive description thereof will be omitted.

Hereinafter, a method by which a host device obtains an MUK according to an eighth embodiment will be described with reference to FIG. 12.

Figure 12:
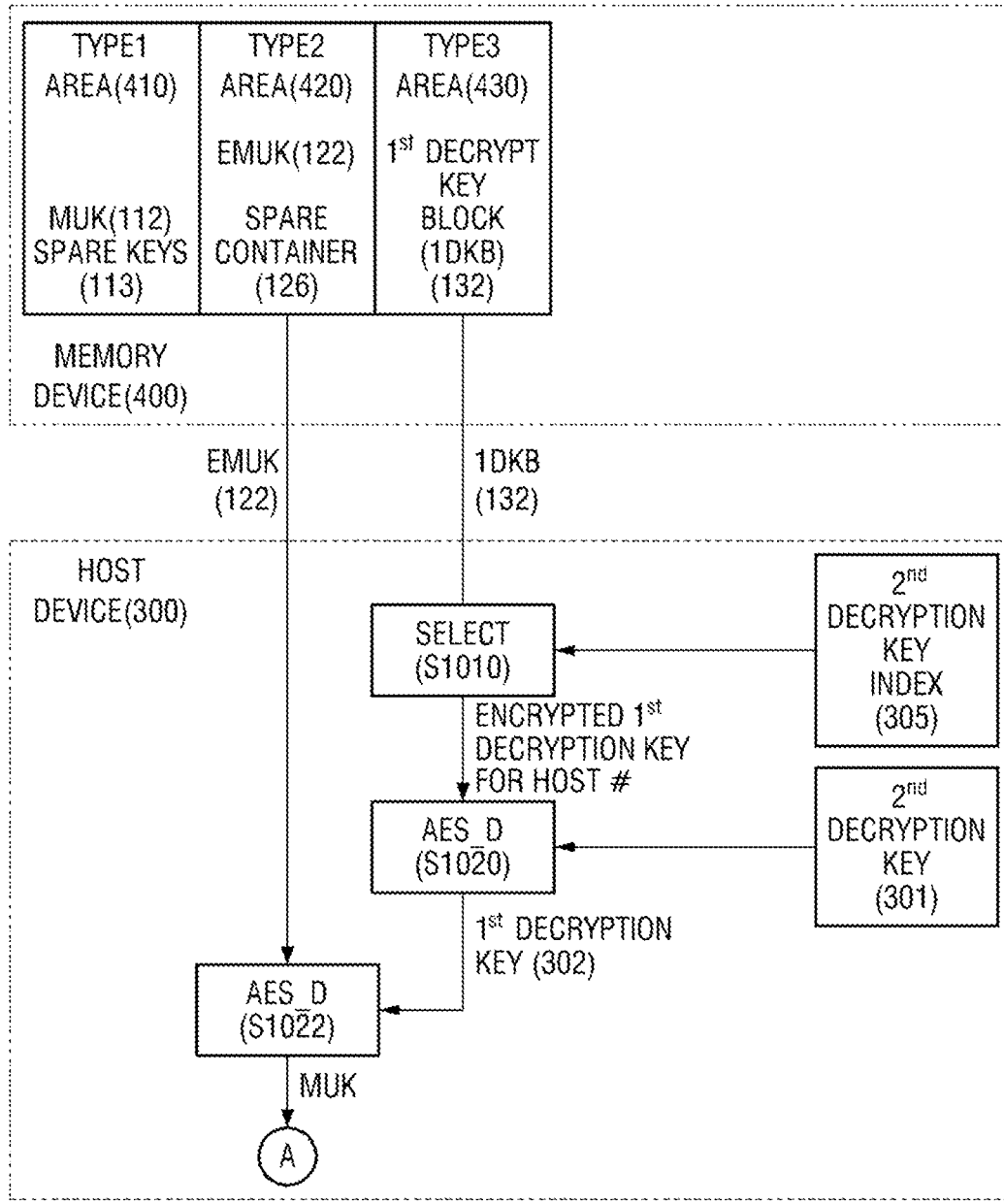
FIG. 12 is a diagram illustrating a method by which a host device obtains an MUK according to an eighth embodiment.

Referring to FIG. 12, a host device 300 selects one of a plurality of encrypted first decryption keys included in a first decryption key block 132 stored in a type3 area 430 of a memory device 400 by referring to a second decryption key index 305 stored in advance in the host device 300 (operation S1010). The first decryption key block 132 may include an encrypted first decryption key for each vendor of external devices such as host device 300, and the second decryption key index 305 may have a unique value for the vendor of the device 300. Alternatively, the keys and indexes may be on a device basis. Preferably, the second decryption key index 305 may have a unique value for each host device vendor.

The host device 300 decrypts the selected encrypted first decryption key using a second decryption key 301 stored in the host device 300 as a decryption key (operation S1020).

Reference character AES_D shown in FIG. 12 indicates that an AES symmetric decryption algorithm is used as a decryption algorithm. Hereinafter, AES_D shown in the drawings will be understood as such, and thus a repetitive description thereof will be omitted. AES_D may also indicate a decryption operation performed using a symmetric decryption algorithm other than the AES symmetric decryption algorithm. Reference character AES_E shown in the drawings indicates that an AES symmetric encryption algorithm is used. Like AES_D, AES_E may also indicate an encryption operation performed using a symmetric encryption algorithm other than the AES symmetric encryption algorithm. Hereinafter, AES_E shown in the drawings will be understood as such, and thus a repetitive description will be omitted.

The host device 300 decrypts an EMUK 122 stored in a type2 area 420 of a memory device 400 using the decrypted first decryption key, thereby obtaining a MUK 112 (operation S1022).

Hereinafter, a method by which a host device authenticates a memory device and a method by which the host device generates a key for encrypting data when the memory device is authenticated successfully according to a ninth embodiment will be described with reference to FIG. 13.

First, a method by which a memory device 400, or storage memory device 1000 according to the current embodiment generates authentication information will be described. Though FIG. 13 denotes the host device 300 authenticates the memory device 400, the host device 300 also can authenticate the storage memory device 1000 having the memory device 400. In this embodiment, a memory controller just transfers commands and data from the host to the memory device or vice versa.

The memory device 400 receives information about the number of a target spare key from a host device 300. This number may be, for example, associated with a type of application or content (e.g., movie, etc.) to reproduce or store from/on the memory device 400. Then, the memory device 400 selects a spare key corresponding to the number of the target spare key from among a plurality of spare keys 113 (operation S1120). In FIG. 13, an $i^{th}$ spare key is selected. Since a type1 area 410 can be accessed only by a secure logic (not shown), the spare keys 113 can be read only by the secure logic.

The memory device 400 encrypts the selected spare key using a spare index variant number 307 received from the host device 300 and generates a spare key variant (operation S1122). The spare key variant=AES_E (spare key, spare key variant number).

Then, the memory device 400 receives a random number generated by the host device 300 (operation S1113). The memory device 400 encrypts the spare key variant using the random number and generates a session key (operation S1124). The session key=AES_E (spare key variant, random number).

The memory device 400 generates authentication information based on an MUK 112 and the session key (operation S1126). The authentication information—AES_G (session key, MUK). The memory device 400 outputs the authentication information to the host device 300.

The generating of the authentication information of the memory device 400 (operation S1126) can be accomplished by a desired (or, alternatively a predetermined) one-way function AES_G that takes the MUK and the session key as inputs. The one-way function encrypts the MUK 112 using the session key of the memory device 400 as a key (AES_E) and then generates the authentication information of the memory device 100b by performing an XOR operation on the result of encryption and MUK 112. It is computationally impossible to find a corresponding input value of the one-way function with each output value of the one-way function. AES_G may be expressed as "AES_G(X1, X2)=AES_E(X1, X2) XOR X2, where X2 is the MUK 112 and X1 is the session key in operation S1126."

Figure 13:
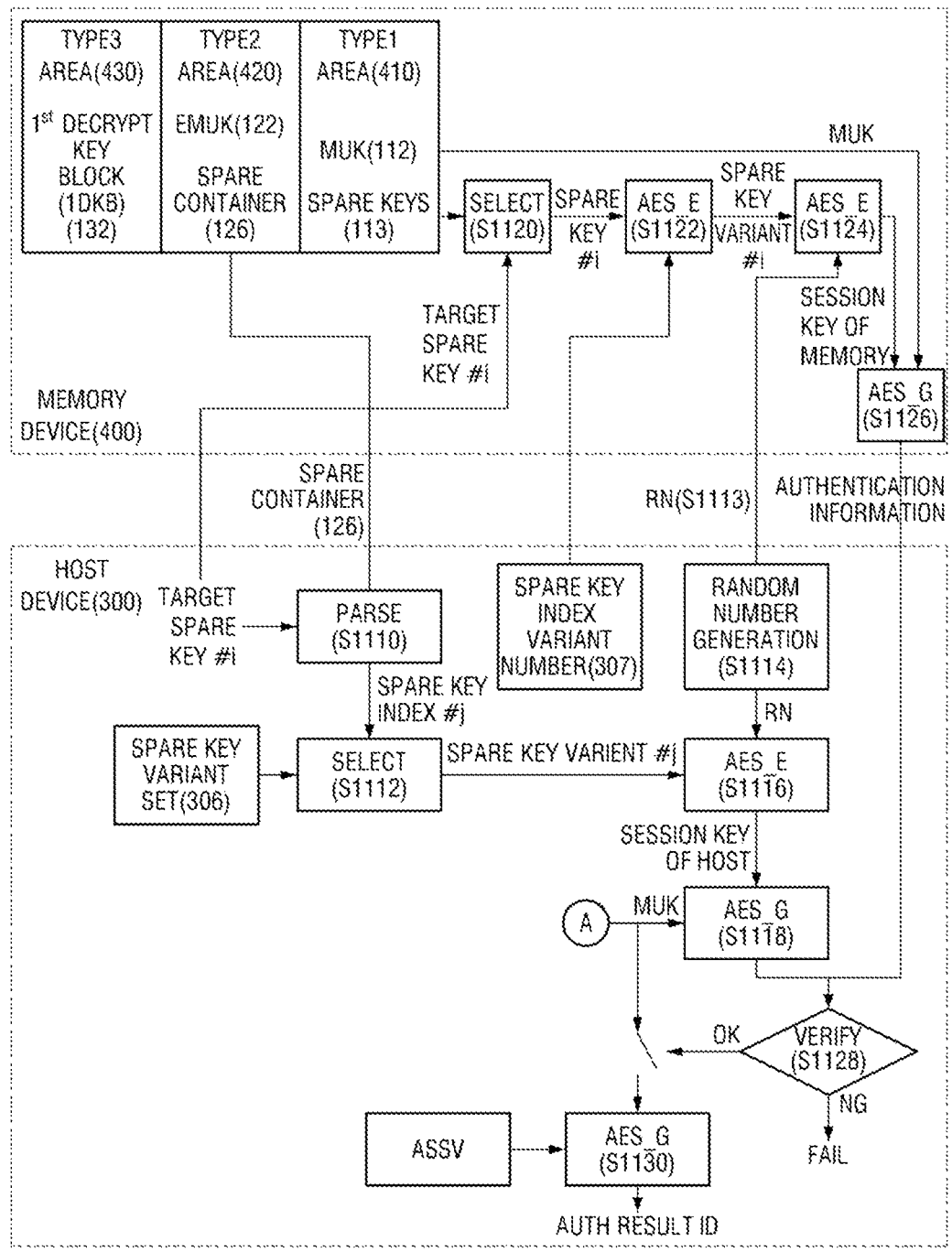
FIG. 13 is a diagram illustrating a method by which a host device authenticates a memory device and a method by which the host device generates a key for data encryption when the memory device is successfully authenticated according to a ninth embodiment.

Reference character AES_G shown in FIG. 13 indicates an one-way function operation which involves two operations, that is, an encryption operation and a XOR operation. Hereinafter, AES_G shown in the drawings will be understood as such, and thus a repetitive description will be omitted.

A method by which the host device 300 authenticates the memory device 400 will now be described.

The host device 300 reads a spare key container 126 stored in a type2 area 420 of the memory device 400, parses data contained in the spare key container 126 by referring to a target spare key number #i designated for this authentication, and selects one of a plurality of spare key variant indices 125 included in the spare key container 126 (operation S1110). For example, as mentioned previously, the indexes may be associated with the vendor of the memory device 400, and each index may be associated with a different spare key number. For example, if an $i^{th}$ target spare key is designated for this authentication as shown in FIG. 13, the host device 300 may select a $j^{th}$ spare key variant index as a result of parsing data contained in the spare key container 126.

The host device 300 selects one spare key variant indicated by the selected $j^{th}$ spare key variant index from a spare key variant set 306 stored therein in advance (operation S1112). The spare key variant set 306 may have many spare key variants each of which is assigned to corresponding spare key variant index and is unique value for each host device vendor or for each host device 300. The set of spare key variants are different possible valves of AES (spare key, spare key variant number). The spare key index selected from the target spare key number provides an index to a spare key variant that is the same as that generated in the memory device in operation S1122 assuming authorized memory device 300 and host device 400 operation.

The host device 300 generates a random number (operation S1114) and encrypts the value of selected spare key variant using the generated random number as a key, and thereby generates a session key.

The host device 300 generates authentication information based on the MUK 112 obtained in advance and the session key thereof (operation S1118). Like the generating of the authentication information of the memory device 400, the generating of the authentication information of the host device 300 can be accomplished by a desired (or, alternatively a predetermined) one-way function which takes the MUK 112 and the session key of the host device 300 as inputs. Here, the one-way function used to generate the authentication information of the memory device 400 may be the same as the one-way function used to generate the authentication information of the host device 300.

The host device 300 authenticates the memory device 400 by comparing the authentication information of the memory device 400 with the authentication information of the host device 300 (operation S1128). For example, if the authentication information of the memory device 400 is the same as the authentication information of the host device 300, the host device determines the memory device 400 is authenticated successfully. If not, the host device determines that the memory device 400 is not authenticated.

If the memory device 400 is successfully authenticated by the host device 300, the host device 300 may generate an authentication result ID as an encryption key for encrypting data. More specifically, the host device 300 may generate an authentication result ID as a data encryption key based on the MUK 112 and an application specific secret value (ASSV) (operation S1130).

The ASSV may be given to each application that runs on the host device 300. For example, different ASSVs may be given to a music playback application, a video playback application, and a software installation application. The ASSV may have a unique value for each type of data that is encrypted or for each provider ID of the data that is encrypted. For example, the type of the data may be a content type, that is, whether the data is a movie, music or software, and the provider of the data may be a content provider. Preferably, the ASSV may have a unique value for each type of the data that is encrypted.

The generating of the authentication result ID (operation S1130) may be accomplished by inputting the MUK 112 and the ASSV to a desired (or, alternatively a predetermined) one-way function and outputting a result value as an authentication result ID. The one-way function may encrypt the MUK 112 using the ASSV as a key (AES_E) and then perform an XOR operation on the result of encryption and the MUK.

Hereinafter, a method by which a host device authenticates a memory device and stores encrypted contents according to a tenth embodiment will be described with reference to FIG. 14.

Figure 14:
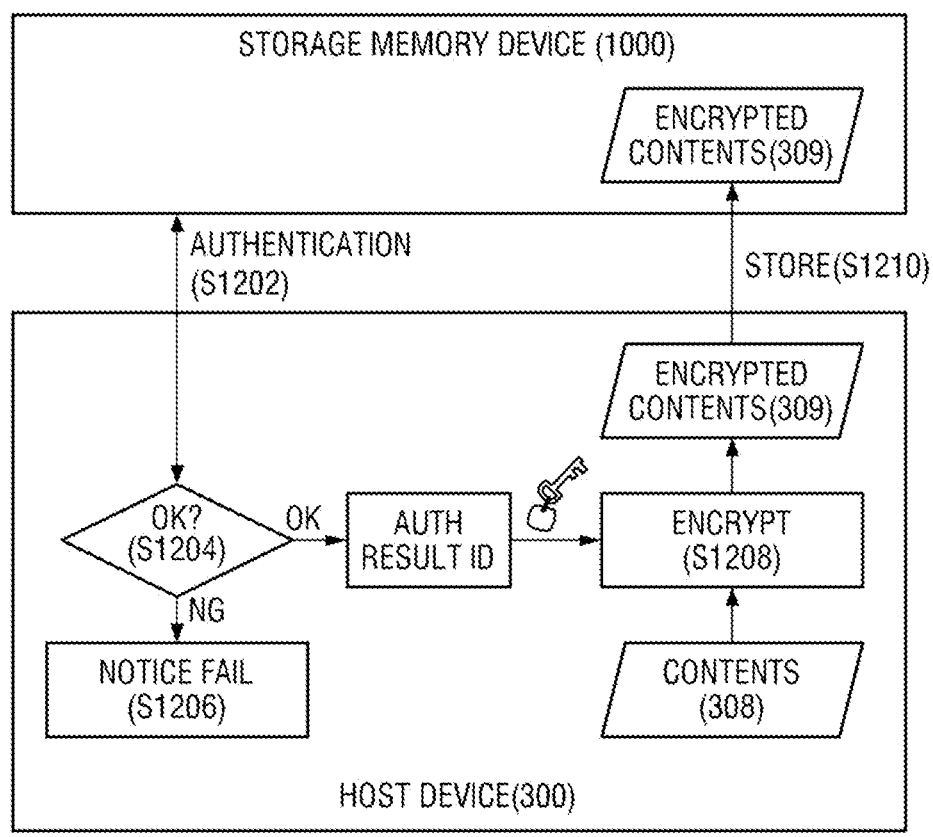
FIG. 14 is a diagram illustrating a method by which a host device authenticates a memory device and stores encrypted contents according to a tenth embodiment.

Referring to FIG. 14, a host device 300 authenticates a memory device 400 using the method of FIG. 13 (operation S1202). If the memory device 400 is not authenticated (operation S1204), a notification of authentication failure may be provided (operation S1206). The memory device 400, if not authenticated successfully, cannot use secure contents but can still be used to input/output general data.

If the memory device 400 is authenticated successfully, an authentication result ID is generated by encrypting the MUK according to AES_G using as ASSV as discussed above with respect to FIG. 13. Target contents 308 are encrypted using the authentication result ID as an encryption key (operation S1208), and the encrypted contents 309 are stored in the memory device 400.

Hereinafter, a storage memory device 1000 according to various embodiments will be described with reference to FIG. 15.

Figure 15:
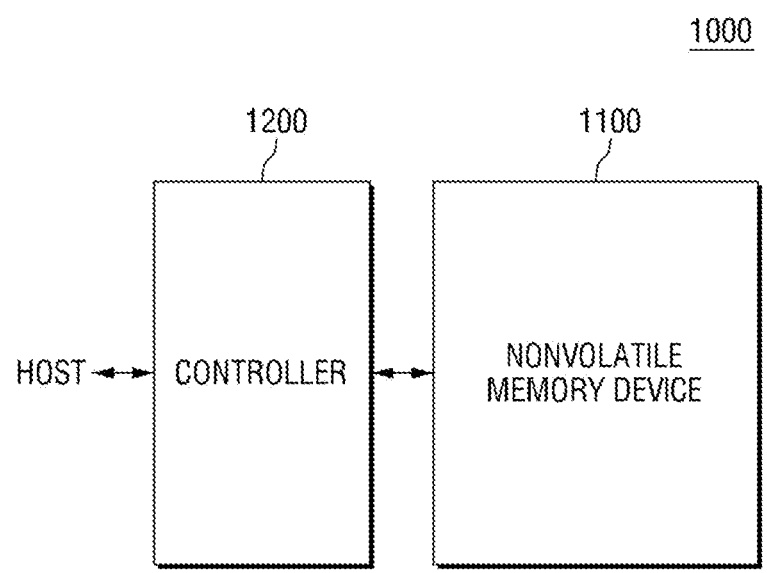
FIG. 15 is a block diagram of a memory device according to various embodiments.

Referring to FIG. 15, a storage memory device 1000 includes a nonvolatile memory device 1100 and a controller 1200. The memory device 100, 100a, 400 or 400a described above may be implemented in the storage memory system 1000 of FIG. 15. Namely, the nonvolatile memory device 1100 may include one or more memory devices (e.g., memory devices 100, 100a, 400, 400a) from the above described embodiments. Similarly, the memory controller 200 described above may be configured as the controller 1200.

The controller 1200 is connected to a host and the nonvolatile memory device 1100. The controller 1200 is configured to access the nonvolatile memory device 1100 in response to a request from the host. For example, the controller 1200 may be configured to control read/write/erase/background operations of the nonvolatile memory device 1100. The controller 1200 may be configured to provide an interface between the nonvolatile memory device 1100 and the host. The controller 1200 may be configured to drive firmware for controlling the nonvolatile memory device 1100.

The controller 1200 further includes well-known components such as a random access memory (RAM), a processing unit, a host interface, and a memory interface. The RAM is used as at least one of a working memory of the processing unit, a cache memory between the nonvolatile memory device 1100 and the host, and a buffer memory between the nonvolatile memory device 1100 and the host. The processing unit controls the overall operation of the controller 1200.

The host interface includes a protocol for data exchange between the host and the controller 1200. For example, the controller 1200 may be configured to communicate with an external device (e.g., the host) using at least one of various interface protocols such as a USB protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol. The memory interface may interface with the nonvolatile memory device 1100. For example, the memory interface includes a NAND interface or a NOR interface.

The storage memory device 1000 may further include an error correction block (e.g., in the memory controller 1200). The error correction block may be configured to detect and correct an error in data read from the nonvolatile memory device 1100 by using an error correction code (ECC). For example, the error correction block may be provided as a component of the controller 1200. The error correction block can also be provided as a component of the nonvolatile memory device 1100.

The controller 1200 and the nonvolatile memory device 1100 may be integrated into one semiconductor device. As an example, the controller 1200 and the nonvolatile memory device 1100 may be integrated into one semiconductor device to comprise a memory card. For example, the controller 1200 and the nonvolatile memory device 1100 may be integrated into one semiconductor device to comprise a personal computer (PC) card (e.g., Personal Computer Memory Card International Association (PCMCIA)), a compact flash card (CF), a smart media card (SM/SMC), a memory stick, a multimedia card (e.g., MMC, RS-MMC and MMCmicro), a SD card (e.g., SD, miniSD, microSD, and SDHC), or a universal flash storage (UFS).

Figure 16:
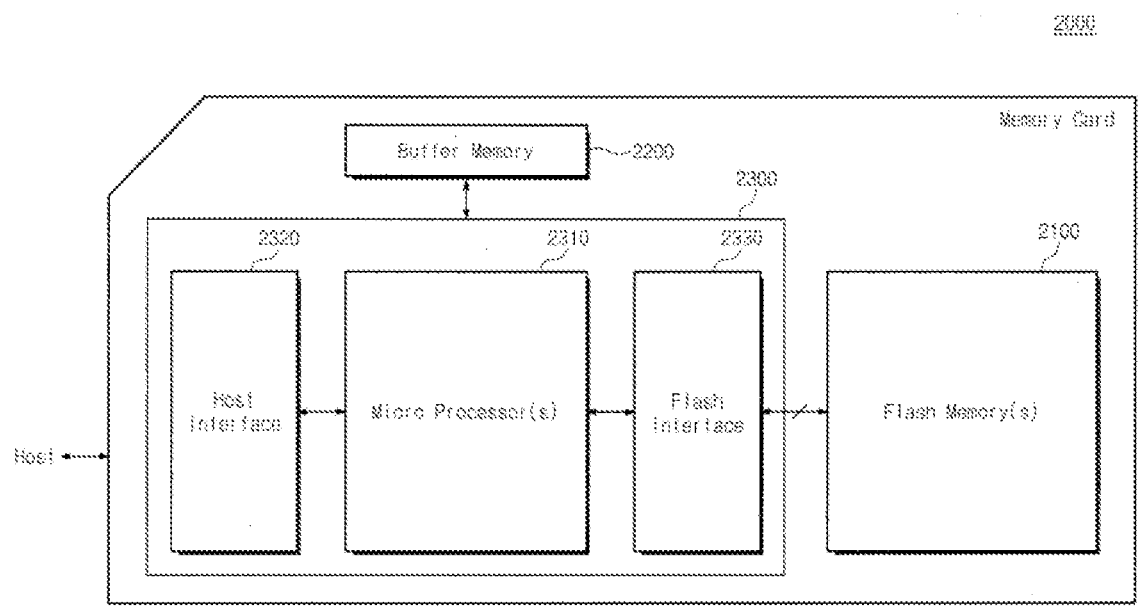
FIG. 16 is a block diagram schematically illustrating a memory card according to an embodiment of the inventive concepts.

FIG. 16 is a block diagram schematically illustrating a memory card according to an embodiment of the inventive concepts. Referring to FIG. 16, a memory card 2000 may include at least one flash memory 2100, a buffer memory device 2200, and a memory controller 2300 for controlling the flash memory 2100 and the buffer memory device 2200. The flash memory 2100 may be the nonvolatile memory device (e.g., memory device 100, 100a, 400, 400a) described with respect to one of the above embodiments. The memory controller 2300 may be the memory controller 200 described with respect to one of the above embodiments.

The buffer memory device 2200 may be used to temporarily store data generated during the operation of the memory card 2000. The buffer memory device 2200 may be implemented using a DRAM or an SRAM. The memory controller 2300 may be connected with the flash memory 2100 via a plurality of channels. The memory controller 2300 may be connected between a host and the flash memory 2100. The memory controller 2300 may be configured to access the flash memory 2100 in response to a request from the host.

The memory controller 2300 may include at least one microprocessor 2310, a host interface 2320, and a flash interface 2330. The microprocessor 2310 may be configured to drive firmware. The host interface 2320 may interface with the host via a card protocol (e.g., SD/MMC) for data exchanges between the host and the memory card 2000. The memory card 2000 is applicable to Multimedia Cards (MMCs), Security Digitals (SDs), miniSDs, memory sticks, smartmedia, and transflash cards.

Detailed description of the memory card 2000 is disclosed in U.S. Patent Publication No. 2010/0306583, the entire contents of which are herein incorporated by reference.

Figure 17:
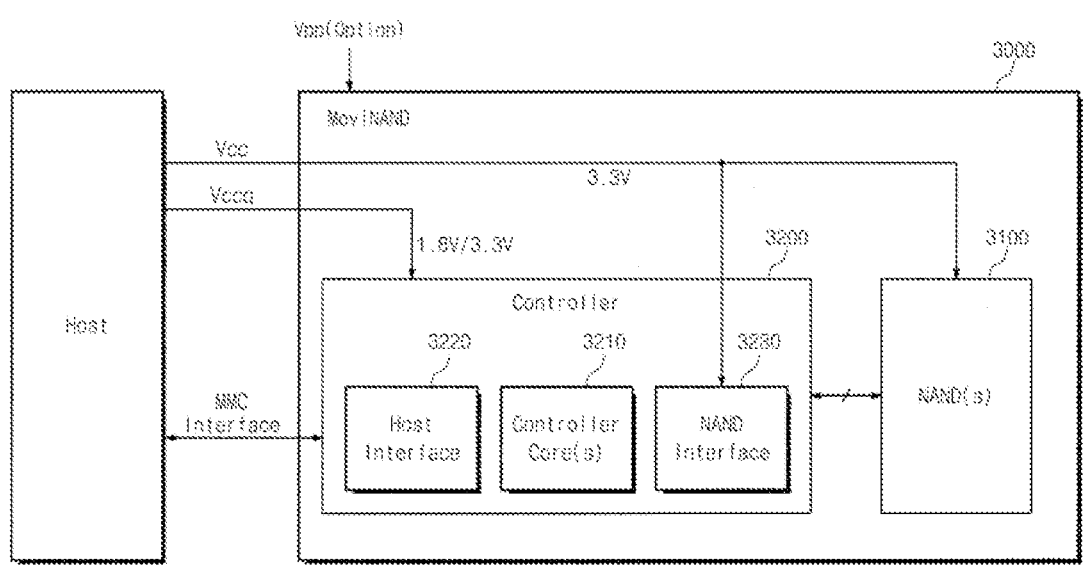
FIG. 17 is a block diagram schematically illustrating a moviNAND according to an embodiment of the inventive concepts.

FIG. 17 is a block diagram schematically illustrating a moviNAND according to an embodiment of the inventive concepts. Referring to FIG. 17, a moviNAND device 3000 may include at least one NAND flash memory device 3100 and a controller 3200. The moviNAND device 3000 may support the MMC 4.4 (or, referred to as "eMMC") standard. The flash memory device 3100 may be the nonvolatile memory device (e.g., memory device 100, 100a, 400, 400a) described with respect to one of the above embodiments. The controller 3200 may be the memory controller 200 described with respect to one of the above embodiments.

The NAND flash memory device 3100 may be a single data rate (SDR) NAND flash memory device or a double data rate (DDR) NAND flash memory device. In example embodiments, the NAND flash memory device 3100 may include NAND flash memory chips. Herein, the NAND flash memory device 3100 may be implemented by stacking the NAND flash memory chips at one package (e.g., FBGA, Fine-pitch Ball Grid Array, etc.).

The controller 3200 may be connected with the flash memory device 3100 via a plurality of channels. The controller 3200 may include at least one controller core 3210, a host interface 3220, and a NAND interface 3230. The controller core 3210 may control an overall operation of the moviNAND device 3000.

The host interface 3220 may be configured to perform an MMC interface between the controller 3210 and a host, which may be the host 300 described with respect to any of the above embodiments. The NAND interface 3230 may be configured to interface between the NAND flash memory device 3100 and the controller 3200. In example embodiments, the host interface 3220 may be a parallel interface (e.g., an MMC interface). In other example embodiments, the host interface 3250 of the moviNAND device 3000 may be a serial interface (e.g., UHS-II, UFS, etc.).

The moviNAND device 3000 may receive power supply voltages Vcc and Vccq from the host. Herein, the power supply voltage Vcc (about 3V) may be supplied to the NAND flash memory device 3100 and the NAND interface 3230, while the power supply voltage Vccq (about 1.8V/3V) may be supplied to the controller 3200. In example embodiments, an external high voltage Vpp may be optionally supplied to the moviNAND device 3000.

The moviNAND device 3000 according to an embodiment of the inventive concepts may be advantageous to store mass data as well as may have an improved read characteristic. The moviNAND device 3000 according to an embodiment of the inventive concepts is applicable to small and low-power mobile products (e.g., a Galaxy S, iPhone, etc.).

The moviNAND device 3000 illustrated in FIG. 17 may be supplied with a plurality of power supply voltages Vcc and Vccq. However, the inventive concepts are not limited thereto. The moviNAND device 3000 can be configured to generate a power supply voltage of 3.3V suitable for a NAND interface and a NAND flash memory by boosting or regulating the power supply voltage Vcc internally. Internal boosting or regulating is disclosed in U.S. Pat. No. 7,092,308, the entire contents of which are herein incorporated by reference.

The inventive concepts are applicable to a solid state drive (SSD).

Figure 18:
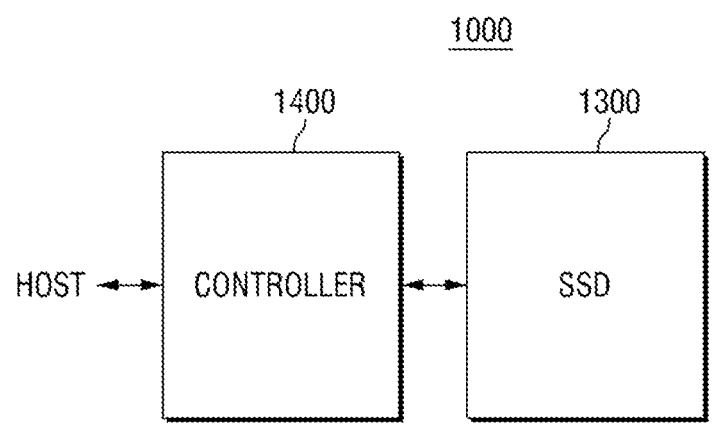
FIG. 18 is another block diagram of a memory device according to various embodiments.

Referring to FIG. 18, a storage memory device 1000 may be embodied as a SSD (Solid State Drive) 1300 and a controller 1400. The SSD includes a memory device according to any of the above described embodiments and stores data in a semiconductor memory. The controller 1400 may be the controller 200 according to any of the above described embodiments. The operation speed of the host (e.g., host 300 according to any of the above embodiments), connected to the storage memory device 1000, may increase significantly.

Figure 19:
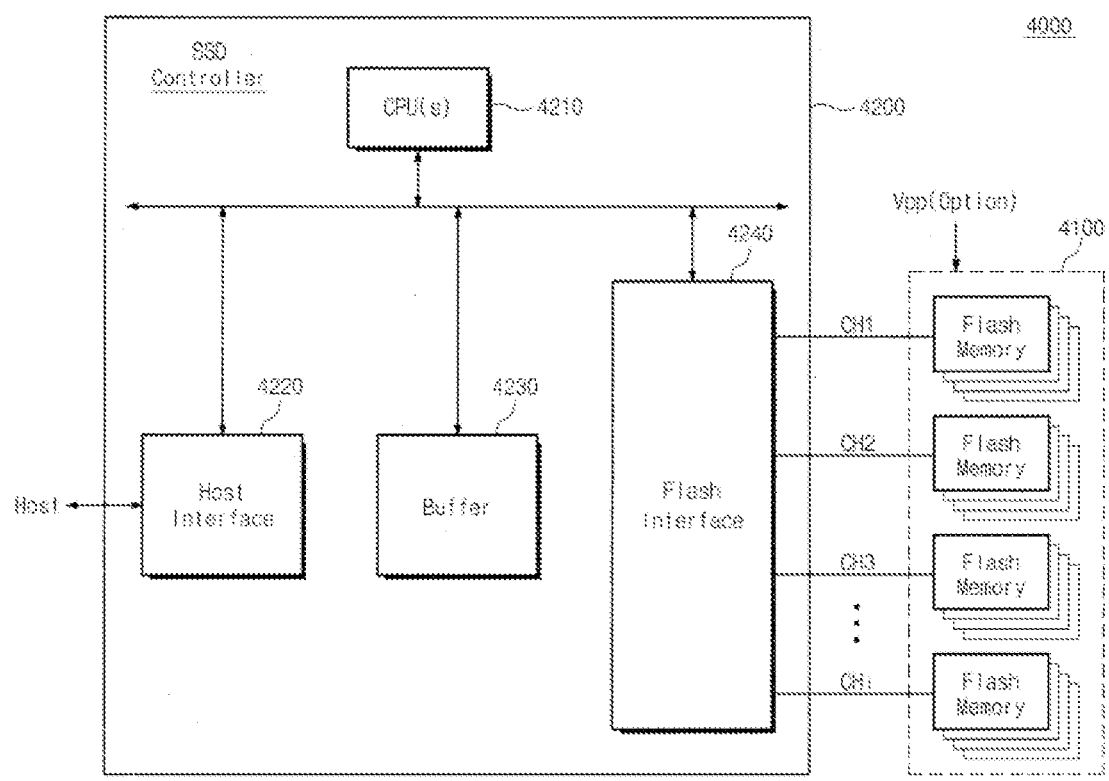
FIG. 19 is a block diagram schematically illustrating a solid state drive according to an embodiment of the inventive concepts.

FIG. 19 is a block diagram schematically illustrating a solid state drive according to an embodiment of the inventive concepts. Referring to FIG. 19, a solid state drive (SSD) 4000 may include a plurality of flash memory devices 4100 and an SSD controller 4200. The flash memory devices 4100 may be the nonvolatile memory device (e.g., memory device 100, 100a, 400, 400a) described with respect to one of the above embodiments. The controller 4200 may be the memory controller 200 described with respect to one of the above embodiments.

The flash memory devices 4100 may be optionally supplied with a high voltage Vpp from the outside. The SSD controller 4200 may be connected to the flash memory devices 4100 via a plurality of channels CH1 to CHi. The SSD controller 4200 may include at least one CPU 4210, a host interface 4220, a buffer memory 4230, and a flash interface 4240.

Under the control of the CPU 4210, the host interface 4220 may exchange data with a host through the communication protocol. In example embodiments, the communication protocol may include the Advanced Technology Attachment (ATA) protocol. The ATA protocol may include a Serial Advanced Technology Attachment (SATA) interface, a Parallel Advanced Technology Attachment (PATA) interface, an External SATA (ESATA) interface, and the like. In other example embodiments, the communication protocol may include the Universal Serial Bus (UBS) protocol. Data to be received or transmitted from or to the host through the host interface 4220 may be delivered through the buffer memory 4230 without passing through a CPU bus, under the control of the CPU 4210.

The buffer memory 4230 may be used to temporarily store data transferred between an external device and the flash memory devices 4100. The buffer memory 4230 can be used to store programs to be executed by the CPU 4210. The buffer memory 4230 may be implemented using an SRAM or a DRAM. The buffer memory 4230 in FIG. 19 may be included within the SSD controller 4200. However, the inventive concepts are not limited thereto. The buffer memory 4230 according to an embodiment of the inventive concepts can be provided at the outside of the SSD controller 4200.

The flash interface 4240 may be configured to interface between the SSD controller 4200 and the flash memory devices 4100 that are used as storage devices. The flash interface 4240 may be configured to support NAND flash memories, One-NAND flash memories, multi-level flash memories, or single-level flash memories.

The SSD according to an embodiment of the inventive concepts may improve the reliability of data by storing random data at a program operation. More detailed description of the SSD 4000 is disclosed in U.S. Pat. No. 8,027,194 and U.S. Patent Publication Nos. 2007/0106836 and 2010/0082890, the entire contents of which are herein incorporated by reference.

As other examples (some mentioned above), the storage memory device 1000 may be applicable to computers, ultra-mobile PCs (UMPCs), workstations, net-books, personal digital assistants (PDAs), portable computers, web tablets, wireless phones, mobile phones, smart phones, e-books, portable multimedia players (PMPs), portable game devices, navigation devices, black boxes, digital cameras, three-dimensional televisions, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

Figure 20:
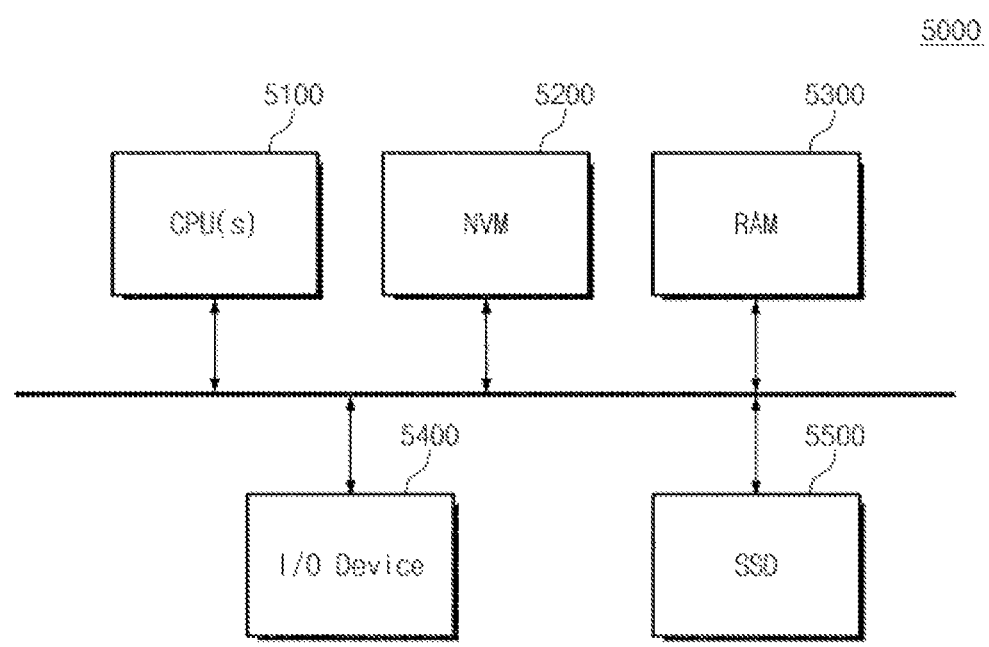
FIG. 20 is a block diagram schematically illustrating a computing system including an SSD in FIG. 30 according to an embodiment of the inventive concepts.

FIG. 20 is a block diagram schematically illustrating a computing system including an SSD in FIG. 19 according to an embodiment of the inventive concepts. Referring to FIG. 20, a computing system 5000 may include at least one CPU 5100, a nonvolatile memory device 5200, a RAM 5300, an input/output (I/O) device 5400, and an SSD 4000.

The CPU 5100 may be connected to a system bus. The CPU 5100 may be part of the host device 300 in the above described embodiments. The nonvolatile memory device 5200 may store data used to drive the computing system 5000. Herein, the data may include a start command sequence or a basic I/O system (BIOS) sequence. The RAM 5300 may temporarily store data generated during the execution of the CPU 5100. The I/O device 5400 may be connected to the system bus through an I/O device interface such as keyboards, pointing devices (e.g., mouse), monitors, modems, and the like. The SSD 5500 may be a readable storage device and may be implemented the same as the SSD 4000 of FIG. 19.

Figure 21:
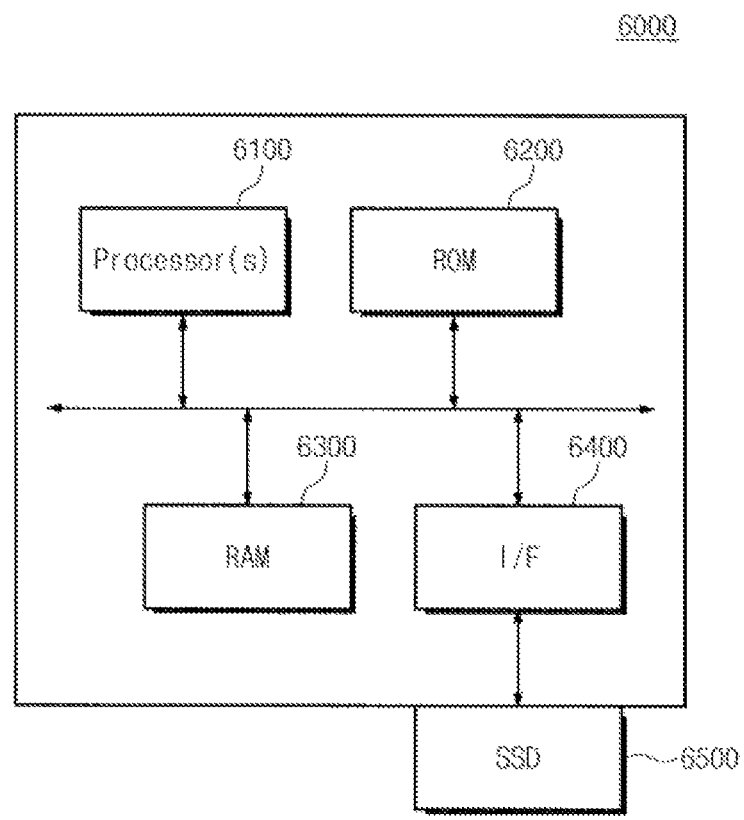
FIG. 21 is a block diagram schematically illustrating an electronic device including an SSD in FIG. 30 according to an embodiment of the inventive concepts.

FIG. 21 is a block diagram schematically illustrating an electronic device including an SSD in FIG. 19 according to an embodiment of the inventive concepts. Referring to FIG. 21, an electronic device 6000 may include a processor 6100, a ROM 6200, a RAM 6300, a flash interface 6400, and at least one SSD 6500.

The processor 6100 may access the RAM 6300 to execute firmware codes or other codes. The processor 6100 may be part of the host device in the above described embodiments. Also, the processor 6100 may access the ROM 6200 to execute fixed command sequences such as a start command sequence and a basic I/O system (BIOS) sequence. The flash interface 6400 may be configured to interface between the electronic device 6000 and the SSD 6500. The SSD 6500 may be detachable from the electronic device 6000. The SSD 6500 may be implemented the same as the SSD 4000 of FIG. 19.

The electronic device 6000 may include cellular phones, personal digital assistants (PDAs), digital cameras, camcorders, portable audio players (e.g., MP3), and portable media players (PMPs).

Figure 22:
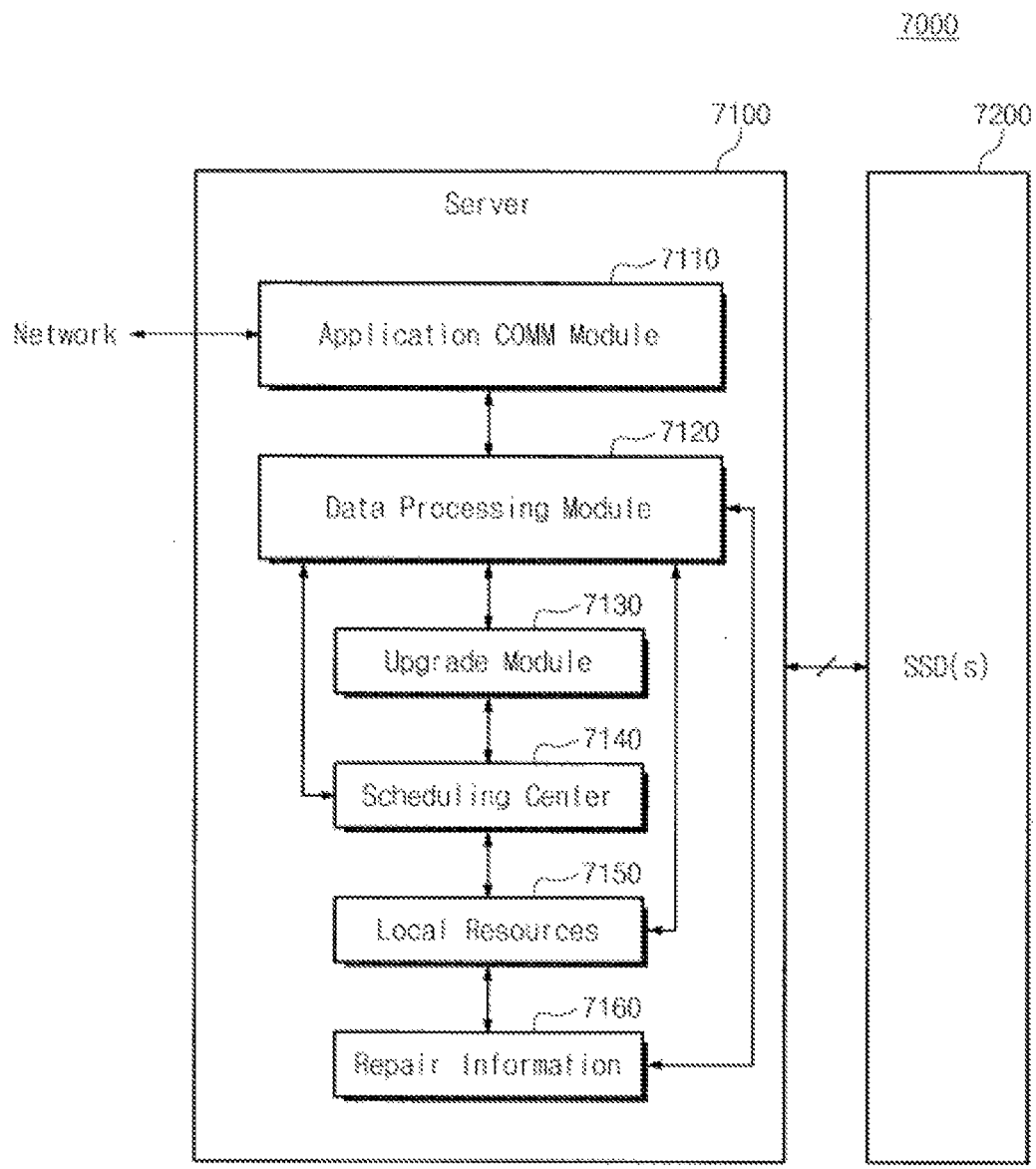
FIG. 22 is a block diagram schematically illustrating a server system including an SSD in FIG. 30 according to an embodiment of the inventive concepts.

FIG. 22 is a block diagram schematically illustrating a server system including an SSD in FIG. 19 according to an embodiment of the inventive concepts. Referring to FIG. 22, a server system 7000 may include a server 7100 and at least one SSD 7200 that stores data used to drive the server 7100. The SSD 7200 may be configured the same as an SSD 4000 of FIG. 19. The server 7100 may be the host device 300 described with respect to the above embodiments.

The server 7100 may include an application communication module 7110, a data processing module 7120, an upgrade module 7130, a scheduling center 7140, a local resource module 7150, and a repair information module 7160. The application communication module 7110 may be configured to communicate with a computing system connected to a network and the server 7100, or to allow the server 7100 to communicate with the SSD 7200. The application communication module 7110 may transmit data or information, provided through a user interface, to the data processing module 7120.

The data processing module 7120 may be linked to the local resource module 7150. Here, the local resource module 7150 may provide a list of repair shops/dealers/technical information to a user on the basis of information or data inputted to the server 7100. The upgrade module 7130 may interface with the data processing module 7120. Based on information or data received from the SSD 7200, the upgrade module 7130 may perform upgrades of a firmware, a reset code, a diagnosis system, or other information on electronic appliances.

The scheduling center 7140 may provide real-time options to the user based on the information or data inputted to the server 7100. The repair information module 7160 may interface with the data processing module 7120. The repair information module 7160 may be used to provide repair-related information (e.g., audio, video or document files) to the user. The data processing module 7120 may package information related to the information received from the SSD 7200. The packaged information may be transmitted to the SSD 7200 or may be displayed to the user.

As mentioned, the inventive concepts are applicable to mobile products (e.g., smart phones, mobile phones, etc.).

Figure 23:
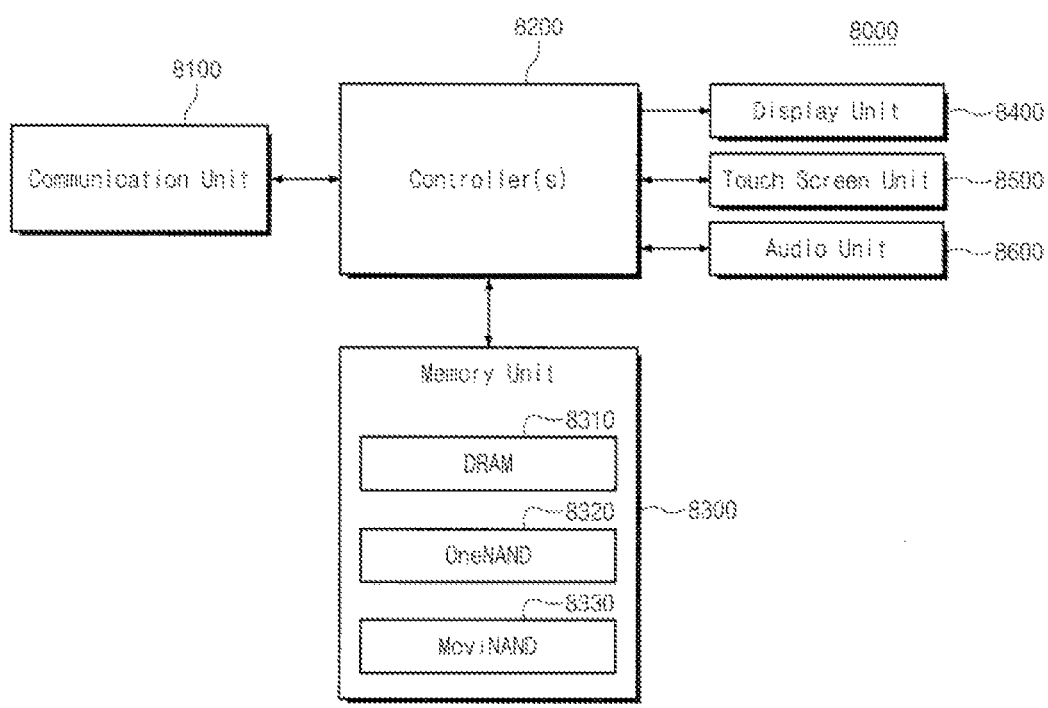
FIG. 23 is a block diagram schematically illustrating a mobile device according to an embodiment of the inventive concepts.

FIG. 23 is a block diagram schematically illustrating a mobile device according to an embodiment of the inventive concepts. Referring to FIG. 23, a mobile device 8000 may include a communication unit 8100, a controller 8200, a memory unit 8300, a display unit 8400, a touch screen unit 8500, and an audio unit 8600.

The memory unit 8300 may include at least one DRAM 8310 and at least one nonvolatile memory device 8330 such as moviNAND or eMMC. The nonvolatile memory device 8330 may be the memory device described with respect to one of the above embodiments. The controller 8200 may be the controller and/or host device described with respect to one of the above embodiments.

Detailed description of the mobile device is disclosed in U.S. Patent Publication Nos. 2010/0062715, 2010/00199081, and 2010/0309237, the entire contents of which are herein incorporated by reference.

As mentioned, the inventive concepts are applicable to tablet products.

Figure 24:
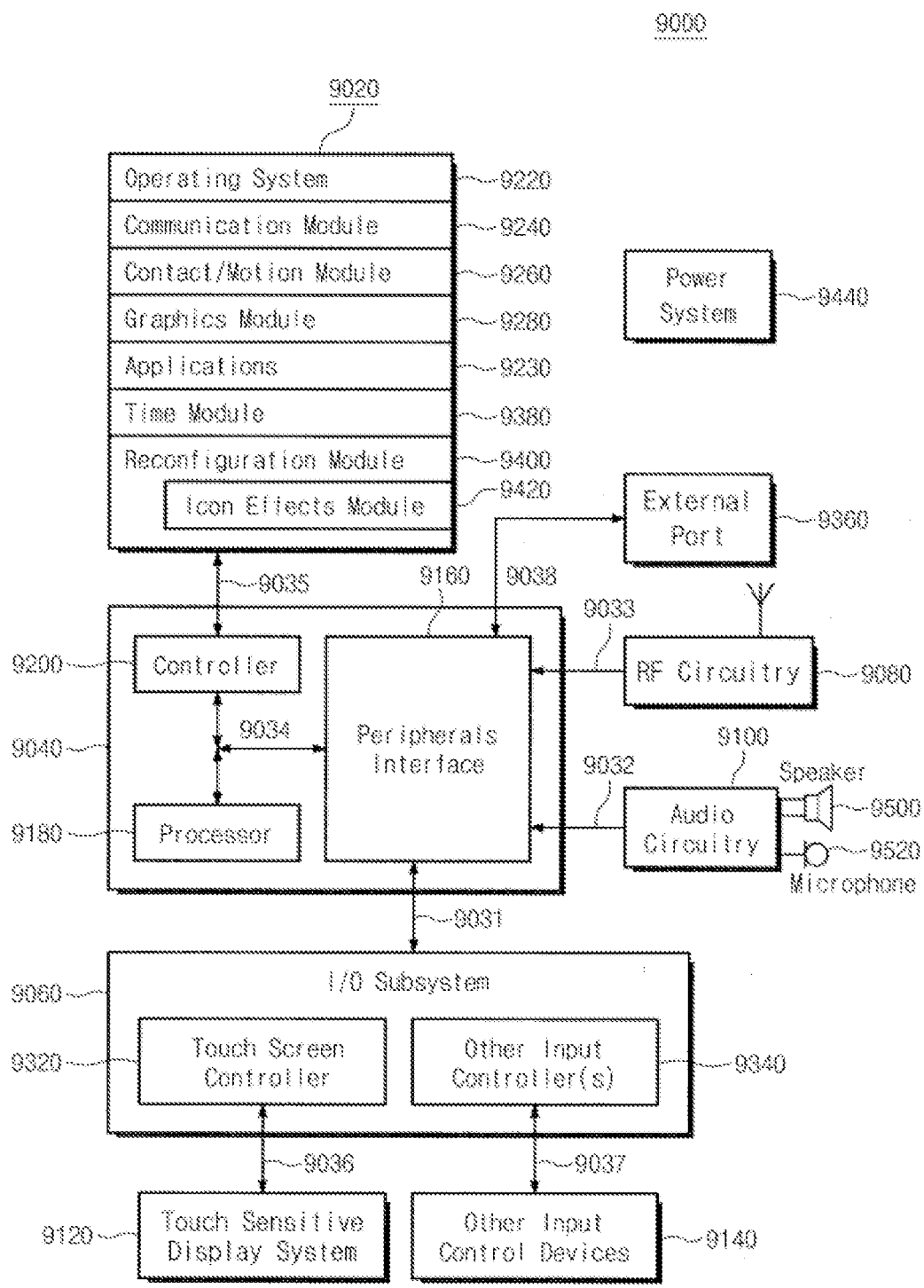
FIG. 24 is a block diagram schematically illustrating a handheld electronic device according to an embodiment of the inventive concepts.

FIG. 24 is a block diagram schematically illustrating a handheld electronic device according to an embodiment of the inventive concepts. Referring to FIG. 24, a handheld electronic device 9000 may include at least one computer-readable media 9020, a processing system 9040, an input/output sub-system 9060, a radio frequency circuit 9080, and an audio circuit 9100. Respective constituent elements can be interconnected by at least one communication bus or a signal line 9030.

The handheld electronic device 9000 may be a portable electronic device including a handheld computer, a tablet computer, a cellular phone, a media player, a PDA, or a combination of two or more thereof. Herein, the at least one computer-readable media 9020 may be the memory system 1000 according to one of the above described embodiments, and the processing system 9040 may be the host devices according to one of the above described embodiments. Detailed description of the handheld electronic device 9000 is disclosed in U.S. Pat. No. 7,509,588, the entirety of which is incorporated by reference herein.

As another example, the nonvolatile memory device 1100 or the memory system 1100 may be mounted in various types of packages. Examples of packages that may include the nonvolatile memory device 1100 or the memory system 1000 include PoP, BGAs, CSPs, PLCC, PDIP, Die in Waffle Pack, Die in Wafer Form, COB, CERDIP, MQFP, TQFP, SOIC, SSOP, TSOP, TQFP, SIP, MCP, WFP, and WSP.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

We claim:

1. A nonvolatile memory device including a memory array, comprising:
   a first memory area in the memory array storing secure data, the first memory area being unable to be read by an external device in response to a request from the external device for the secure data, and the secure data being programmed by a vendor of the nonvolatile memory device;
   a second memory area in the memory array storing encrypted secure data, the second memory area being accessible by the external device; and
   secure logic configured to access the secure data from the first memory area in response to the request, generate the encrypted secure data from the accessed secure data, and store the encrypted secure data in the second memory area so that the stored encrypted secure data is accessible by the external device,
   wherein the secure data includes a unique key of the nonvolatile memory device and the secure logic is located in the nonvolatile memory device,
   wherein the first memory area is configured to store a plurality of spare keys, the plurality of spare keys for generating authentication information of the nonvolatile memory device, and
   wherein the second memory area is configured to store a plurality of spare key indexes, the plurality of spare key indexes being linked to the plurality of spare keys.

2. The nonvolatile memory device of claim 1, wherein the external device is a host device.

3. The nonvolatile memory device of claim 1, wherein the external device is a memory controller.

4. The nonvolatile memory device of claim 1, further comprising:
   input/output logic configured to interface the nonvolatile memory device with the external device.

5. The nonvolatile memory device of claim 1, wherein the second area is configured to store the encrypted secure data during the manufacture of the nonvolatile memory device.

6. The nonvolatile memory device of claim 1, wherein the unique key is for authenticating the nonvolatile memory device, and the encrypted secure data includes an encrypted unique key.

7. The nonvolatile memory device of claim 1, wherein the spare key corresponds to a vendor of the nonvolatile memory device.

8. The nonvolatile memory device of claim 1, further comprising:
   a third memory area configured to store at least one encrypted decryption key, the third memory area being accessible by the external device, the encrypted decryption key being an encrypted version of a decryption key, and the decryption key for decrypting the encrypted unique key.

9. The nonvolatile memory device of claim 8, wherein the third memory area is further configured to store a plurality of encrypted decryption keys, at least one of the plurality of encrypted decryption keys corresponding to a vendor of the external device.

10. The nonvolatile memory device of claim 1, wherein the second memory area is only readable by the external device.

11. A nonvolatile memory device including a memory array, comprising:
   a first memory area in the memory array storing a main key and at least one spare key, the first memory area being unable to be read by external devices in response to a request from the external devices for secure data that includes the main key, the main key and the least one spare key being programmed by a vendor of the nonvolatile memory device, the main key being a unique key of the nonvolatile memory device; and
   a second memory area in the memory array storing at least one spare key index and encrypted secure data including an encrypted main key, the second memory area being accessible by the external devices so that the stored encrypted secure data is accessible in response to the request, the encrypted secure data being an encrypted version of the secure data in the first memory area, the spare key index being linked to the spare key, and the spare key being associated with a vendor of the nonvolatile memory device.

12. The nonvolatile memory device of claim 11, wherein the spare key index is linked to the spare key by a spare key number.

13. The nonvolatile memory device of claim 11, wherein the first memory area stores a plurality of spare keys; and the second memory area is configured to store a plurality of spare key indexes, the plurality of spare key indexes being linked to the plurality of spare keys.

14. The nonvolatile memory device of claim 13, wherein the plurality of spare key indexes are linked to the plurality of spare keys by spare key numbers.

15. The nonvolatile memory device of claim 11, further comprising:
a third memory area storing a plurality of encrypted decryption keys, the third memory area being accessible by the external device, the encrypted decryption keys being encrypted versions of a respective plurality of decryption keys, the plurality of decryption keys being for decrypting the encrypted main key, and the plurality of decryption keys being associated with vendors of the external devices.

16. A nonvolatile memory device including a memory array, comprising:
a first memory area in the memory array storing secure data, the secure data being programmed by a vendor of the nonvolatile memory device, the secure data including a unique key of the nonvolatile memory device;
a second memory area in the memory array storing encrypted secure data, the encrypted secure data being an encrypted version of the secure data in the first memory area;
secure logic configured to access the secure data from the first memory area in response to a request for the secure data, generate the encrypted secure data from the accessed secure data, and store the encrypted secure data in the second memory area; and
the nonvolatile memory device configured such that output of the secure data cannot occur in response to the request, and output of the encrypted secure data can occur in response to the request,
wherein the secure logic is located in the nonvolatile memory device,
wherein the first memory area is configured to store a plurality of spare keys, the plurality of spare keys for generating authentication information of the nonvolatile memory device, and
wherein the second memory area is configured to store a plurality of spare key indexes, the plurality of spare key indexes being linked to the plurality of spare keys.

17. A method of operating a nonvolatile memory device including a memory array, comprising:
storing secure data in a first memory area of the memory array, the first memory area being unable to be read by an external device in response to a request from the external device for the secure data, the secure data being programmed by a vendor of the nonvolatile memory device, the secure data including a unique key of the nonvolatile memory device;
accessing the secure data from the first memory area using logic resident on the nonvolatile memory device in response to the request;
generating an encrypted secure data from the accessed secure data using the logic; and
storing the encrypted secure data in a second memory area of the memory array so that the stored encrypted secure data is accessible by the external device from the second memory area, the encrypted secure data being an encrypted version of the secure data in the first memory area;
storing at least one spare key in the first memory area, the spare key for generating authentication information of the nonvolatile memory device; and
storing at least one spare key index in the second memory area, the spare key index being linked to the spare key.

18. The method of claim 17, wherein the unique key is for authenticating the nonvolatile memory device, and the encrypted secure data includes an encrypted unique key.

19. The method of claim 18, wherein the spare key corresponds to a vendor of the nonvolatile memory device.

20. The method of claim 18, wherein the spare key index is linked to the spare key by a spare key number.

21. The method of claim 18, further comprising:
storing at least one encrypted decryption key in a third memory area of the nonvolatile memory device, the third memory area being accessible by the external device, the encrypted decryption key being an encrypted version of a decryption key, and the decryption key for decrypting the encrypted main key.

22. The method of claim 21, wherein the encrypted decryption keys corresponds to vendors of external devices.

* * * * *